(12) United States Patent
Burrows et al.

(10) Patent No.: US 12,312,271 B2
(45) Date of Patent: May 27, 2025

(54) FLEXIBLE AEROGEL, FLEXIBLE GLASS TECHNOLOGY

(71) Applicant: Cardinal CG Company, Eden Prairie, MN (US)

(72) Inventors: Keith James Burrows, Mineral Point, WI (US); Kari B. Myli, Sauk City, WI (US)

(73) Assignee: Cardinal CG Company, Eden Prairie, MN (US)

( * ) Notice: Subject to any disclaimer, the term of this patent is extended or adjusted under 35 U.S.C. 154(b) by 257 days.

(21) Appl. No.: 17/679,678

(22) Filed: Feb. 24, 2022

(65) Prior Publication Data
US 2022/0332633 A1    Oct. 20, 2022

Related U.S. Application Data

(60) Provisional application No. 63/175,246, filed on Apr. 15, 2021.

(51) Int. Cl.
*C03C 17/28* (2006.01)
*B32B 17/10* (2006.01)
*C03C 17/00* (2006.01)

(52) U.S. Cl.
CPC ........ *C03C 17/28* (2013.01); *B32B 17/10045* (2013.01); *B32B 17/10055* (2013.01);
(Continued)

(58) Field of Classification Search
None
See application file for complete search history.

(56) References Cited

U.S. PATENT DOCUMENTS

| 4,402,927 A | 9/1983 | Von Dardel et al. |
| 4,610,863 A | 9/1986 | Tewari et al. |

(Continued)

FOREIGN PATENT DOCUMENTS

| AU | 688208 B2 | 3/1998 |
| CA | 2036634 A1 | 9/1991 |

(Continued)

OTHER PUBLICATIONS

Machine translation of WO-2018170772-A1, Apr. 27, 2018 (Year: 2018).*

(Continued)

*Primary Examiner* — Barbara J Musser
(74) *Attorney, Agent, or Firm* — Fredrikson & Byron, P.A.

(57) ABSTRACT

The invention provides a method of processing glass that involves forming a flexible gel layer on a flexible glass sheet to create a glass-gel sheet; rolling-up the glass-gel sheet into the form of a roll; placing the roll in a dryer; and drying the flexible gel layer so as to form a flexible aerogel layer. Some embodiments provide a glazing unit that includes a glass-aerogel sheet located between first and second panes of the glazing unit, where the glass-aerogel sheet includes a flexible glass sheet and a flexible aerogel layer on the flexible glass sheet. In such embodiments, the first and second panes each have thicknesses that are greater than a thickness of the flexible glass sheet. Other embodiments provide a glass assembly having a flexible aerogel layer on a flexible glass sheet, with the flexible glass sheet being laminated to a glass pane.

39 Claims, 14 Drawing Sheets

(52) U.S. Cl.
CPC .. *B32B 17/10165* (2013.01); *B32B 17/10761* (2013.01); *B32B 17/10899* (2013.01); *B32B 17/10981* (2013.01); *C03C 17/007* (2013.01); *B32B 17/10201* (2013.01); *B32B 2255/26* (2013.01); *B32B 2307/304* (2013.01); *B32B 2307/732* (2013.01); *B32B 2309/105* (2013.01); *B32B 2315/08* (2013.01); *B32B 2329/06* (2013.01); *B32B 2419/00* (2013.01); *C03C 2217/425* (2013.01); *C03C 2217/70* (2013.01); *C03C 2218/32* (2013.01)

(56) References Cited

U.S. PATENT DOCUMENTS

| | | | |
|---|---|---|---|
| 4,765,818 | A | 8/1988 | Che et al. |
| 4,928,448 | A | 5/1990 | Phillip |
| 5,027,574 | A | 7/1991 | Phillip |
| 5,092,101 | A | 3/1992 | Kunert |
| 5,118,543 | A | 6/1992 | Mccoll |
| 5,154,953 | A | 10/1992 | De Moncuit et al. |
| 5,156,895 | A | 10/1992 | Martin |
| 5,242,647 | A | 9/1993 | Poco |
| 5,294,480 | A | 3/1994 | Mielke et al. |
| 5,524,381 | A | 6/1996 | Chahroudi |
| 5,525,430 | A | 6/1996 | Chahroudi |
| 6,627,305 | B1 | 9/2003 | Deane et al. |
| 7,117,914 | B2 | 10/2006 | Chick |
| 7,143,800 | B2 | 12/2006 | Chick |
| 7,339,728 | B2 | 3/2008 | Hartig |
| 7,342,716 | B2 | 3/2008 | Hartig |
| 7,572,509 | B2 | 8/2009 | Hartig |
| 7,572,510 | B2 | 8/2009 | Hartig |
| 7,572,511 | B2 | 8/2009 | Hartig |
| 7,780,890 | B2 | 8/2010 | Lee et al. |
| 7,832,177 | B2 | 11/2010 | Stark |
| 7,906,203 | B2 | 3/2011 | Hartig |
| 7,919,158 | B2 | 4/2011 | Seth et al. |
| 8,110,258 | B2 | 2/2012 | Milburn |
| 8,381,490 | B2 | 2/2013 | Back et al. |
| 8,557,356 | B2 | 10/2013 | Colson |
| 8,595,994 | B1 | 12/2013 | Grommesh et al. |
| 8,652,282 | B2 | 2/2014 | Milburn |
| 8,844,218 | B2 | 9/2014 | Showers |
| 8,968,865 | B2 | 3/2015 | Worsley et al. |
| 9,034,934 | B1 | 5/2015 | Attia |
| 9,045,609 | B2 | 6/2015 | Pasquero et al. |
| 9,068,346 | B1 | 6/2015 | Lu et al. |
| 9,249,272 | B2 | 2/2016 | Pasquero et al. |
| 9,862,640 | B2 | 1/2018 | Pfaff et al. |
| 10,000,411 | B2 | 6/2018 | Burrows et al. |
| 10,000,965 | B2 | 6/2018 | Burrows et al. |
| 10,421,253 | B2 | 9/2019 | Van Overmeere et al. |
| 10,500,557 | B2 | 12/2019 | Sakaguchi et al. |
| 2002/0102674 | A1 | 8/2002 | Anderson |
| 2005/0074566 | A1 | 4/2005 | Rouanet et al. |
| 2007/0082124 | A1 | 4/2007 | Hartig |
| 2008/0258065 | A1 | 10/2008 | Banks |
| 2008/0302059 | A1 | 12/2008 | Du Plessis et al. |
| 2009/0029147 | A1 | 1/2009 | Tang et al. |
| 2010/0146880 | A1 | 6/2010 | Valentz et al. |
| 2011/0206874 | A1 | 8/2011 | Showers |
| 2012/0081794 | A1 | 4/2012 | Showers |
| 2012/0128958 | A1 | 5/2012 | Zeng et al. |
| 2013/0136664 | A1 | 5/2013 | Bono et al. |
| 2013/0170218 | A1 | 7/2013 | Mazurek et al. |
| 2013/0202890 | A1 | 8/2013 | Kong et al. |
| 2014/0065329 | A1 | 3/2014 | Showers |
| 2014/0116516 | A1 | 5/2014 | Jones |
| 2014/0141199 | A1 | 5/2014 | Leonard |
| 2015/0004087 | A1 | 1/2015 | Zettl et al. |
| 2015/0077957 | A1 | 3/2015 | Sakatani et al. |
| 2016/0097502 | A1 | 4/2016 | Padiyath et al. |
| 2016/0138324 | A1 | 5/2016 | Lameris et al. |
| 2016/0160557 | A1 | 6/2016 | Kim et al. |
| 2016/0319588 | A1 | 11/2016 | Samanta et al. |
| 2017/0028686 | A1 | 2/2017 | Wilson et al. |
| 2018/0066469 | A1 | 3/2018 | Vogel-Martin et al. |
| 2018/0093456 | A1 | 4/2018 | Van Overmeere et al. |
| 2018/0134194 | A1 | 5/2018 | Kawamura et al. |
| 2018/0166353 | A1 | 6/2018 | Garner et al. |
| 2018/0237608 | A1 | 8/2018 | Hess et al. |
| 2018/0250913 | A1 | 9/2018 | Kotake et al. |
| 2018/0264784 | A1 | 9/2018 | Murofushi et al. |
| 2018/0320824 | A1 | 11/2018 | Fay et al. |
| 2019/0154188 | A1 | 5/2019 | Fujii et al. |
| 2019/0333490 | A1 | 10/2019 | Wang et al. |
| 2020/0148587 | A1 | 5/2020 | Burrows et al. |
| 2020/0340612 | A1 | 10/2020 | Kawamura et al. |
| 2021/0094255 | A1 | 4/2021 | Benkoski et al. |
| 2021/0207428 | A1 | 7/2021 | Pilon et al. |
| 2021/0363812 | A1 | 11/2021 | Hajjaj et al. |
| 2022/0042369 | A1 | 2/2022 | Burrows |
| 2022/0042370 | A1 | 2/2022 | Burrows |
| 2022/0369480 | A1 | 11/2022 | Sage et al. |
| 2023/0050347 | A1 | 2/2023 | Kitzman et al. |

FOREIGN PATENT DOCUMENTS

| | | | |
|---|---|---|---|
| CN | 101481985 | A | 7/2009 |
| CN | 102180603 | A | 9/2011 |
| CN | 202706291 | U | 1/2013 |
| CN | 104898295 | A | 9/2015 |
| CN | 105201355 | A | 12/2015 |
| CN | 204936377 | U | 1/2016 |
| CN | 205117117 | U | 3/2016 |
| CN | 205117118 | U | 3/2016 |
| CN | 106082697 | A | 11/2016 |
| CN | 205736249 | U | 11/2016 |
| CN | 206581820 | U | 10/2017 |
| CN | 206589417 | U | 10/2017 |
| CN | 206983435 | U | 2/2018 |
| CN | 207190441 | U | 4/2018 |
| CN | 108060874 | A | 5/2018 |
| CN | 108623194 | A | 10/2018 |
| CN | 108625741 | A | 10/2018 |
| CN | 109502997 | A | 3/2019 |
| CN | 109592908 | A | 4/2019 |
| CN | 109989680 | A | 7/2019 |
| CN | 112431520 | A | 3/2021 |
| EP | 1414266 | A2 | 4/2004 |
| EP | 3112773 | A1 | 1/2017 |
| GB | 2241468 | A | 9/1991 |
| KR | 101583005 | B1 | 12/2015 |
| WO | 2006065904 | A1 | 6/2006 |
| WO | 2006121954 | A2 | 11/2006 |
| WO | 2008047027 | A1 | 4/2008 |
| WO | 2017090686 | A1 | 6/2017 |
| WO | 2017147463 | A1 | 8/2017 |
| WO | WO-2018170772 | A1 * | 9/2018 |
| WO | 2019241603 | A1 | 12/2019 |
| WO | 2020005965 | A1 | 1/2020 |
| WO | 2020084668 | A1 | 4/2020 |
| WO | 2021129488 | A1 | 7/2021 |
| WO | 2021224228 | A1 | 11/2021 |
| WO | 2022031536 | A1 | 2/2022 |

OTHER PUBLICATIONS

PCT International Search Report and Written Opinion dated May 17, 2022 for related Intl. App. No. PCT/US2022/017671, 9 pgs.

Full English Translation of Chinese Publication No. 109989680 A, published Jul. 9, 2019, 36 pages.

Insight on Color, "Hunter L, a, b Color Scale," Applications Note, vol. 8, No. 9, Jun. 8, 2008, 4 pages.

Buettner, "Investigation of Bacterial Cellulose as a Carbon Fiber Precurser and its Potential for Piezoelectric Energy Harvesting," Thesis, Cornell University, Aug. 2014, 90 pages.

Leitch et al., "Bacterial Nanocellulose Aerogel Membranes: Novel High-Porosity Materials for Membrane Distillation," Environmental Science and Technology Letters, vol. 3, 2016, pp. 8591.

Jia et al., "Preparation and characterization of a novel bacterial cellulose/chitosan bio-hydrogel," Nanomaterials and Nanotechnology, vol. 7, 2017, pp. 18.

(56) References Cited

OTHER PUBLICATIONS

Merli, F et al., "Acoustic measurements on monolithic aerogel samples and application of the selected solutions to standard window systems," Applied Acoustics, 142 (2018), 123-131, 9 pages.

Bhuiya, M.M.H. et al., "Preparation of Monolithic Silica Aerogel for Fenestration Applications: Scaling up, Reducing Cycle Time and Improving Performance," Ind. Chem. Res. (2016), 55, 6971-6981, 11 pages.

Jensen, K.I. et al., "Development of windows based on highly insulating aerogel glazings,"Solids, 350 (2004) 351-357, 7 pages.

Strobach, E., "Optically Transparent, Thermally Insulating and Soundproofing (OTTIS) Aerogel for High-Efficiency Window Applications," Massachusetts Institute of Technology, Jan. 15, 2020, 119 pages.

Paakko et al., "Long and entangled native cellulose I nanofibers allow flexible aerogels and hierarchically porous templates for functionalities" , Soft Matter, 2008, 4, Published Sep. 23, 2008, pp. 2492-2499.

Wilson, "Fascinating world of gas-fill windows", Brattleboro Reformer, Downloaded from www.reformer.com/local-news/fascinating-world-of-gas-fill-windows/article_55f4a3be-da2f-5ba8-8da8-d5b44209f040.html, Published Apr. 3, 2012, pp. 3.

\* cited by examiner

FLEXIBLE AEROGEL, FLEXIBLE GLASS TECHNOLOGY

RELATED APPLICATIONS

This application claims the benefit of U.S. Provisional Patent Application No. 63/175,246, filed Apr. 15, 2021, the contents of which are herein incorporated by reference.

FIELD OF THE INVENTION

The present invention relates to flexible aerogel technology. The present invention also relates to methods of processing glass to produce such flexible aerogel technology.

BACKGROUND OF THE INVENTION

Aerogel is a known thermal insulation material. In some cases, aerogel is provided in granular, particulate form. When aerogel is prepared, it is conventionally dried in a high-pressure vessel. However, at larger sizes that may be used to scale the aerogel material, such chambers become prohibitively expensive and/or technically unfeasible.

It would be desirable to provide a method of processing glass that involves forming a flexible gel layer on a flexible glass sheet to create a glass-gel sheet. In such cases, it would be particularly desirable to roll-up the glass-gel sheet such that it is in the form of a roll, to place the roll in a dryer, and to dry the flexible gel layer so as to convert it into a flexible aerogel layer and thereby change the glass-gel sheet into a glass-aerogel sheet. In some embodiments, it would be desirable to provide a glass assembly comprising a glass pane, an aerogel layer, and a flexible glass sheet, where the aerogel layer is on the flexible glass sheet. In some cases, it would be desirable to adhere the aerogel layer to the glass pane, e.g., through direct contact (e.g., so as to provide van der Waals force) or by providing a polymer lamination interlayer (or an optically-clear adhesive) between and in contact with both the flexible glass sheet and the glass pane. In some embodiments, it would be desirable to provide a glazing unit that includes a glass-aerogel sheet located between first and second panes of the glazing unit, where the glass-aerogel sheet comprises a flexible glass sheet and an aerogel layer on the flexible glass sheet. In such cases, it would be particularly desirable to provide each of the first and second panes with thicknesses that are greater than a thickness of the flexible glass sheet.

SUMMARY OF THE INVENTION

Figure 1:
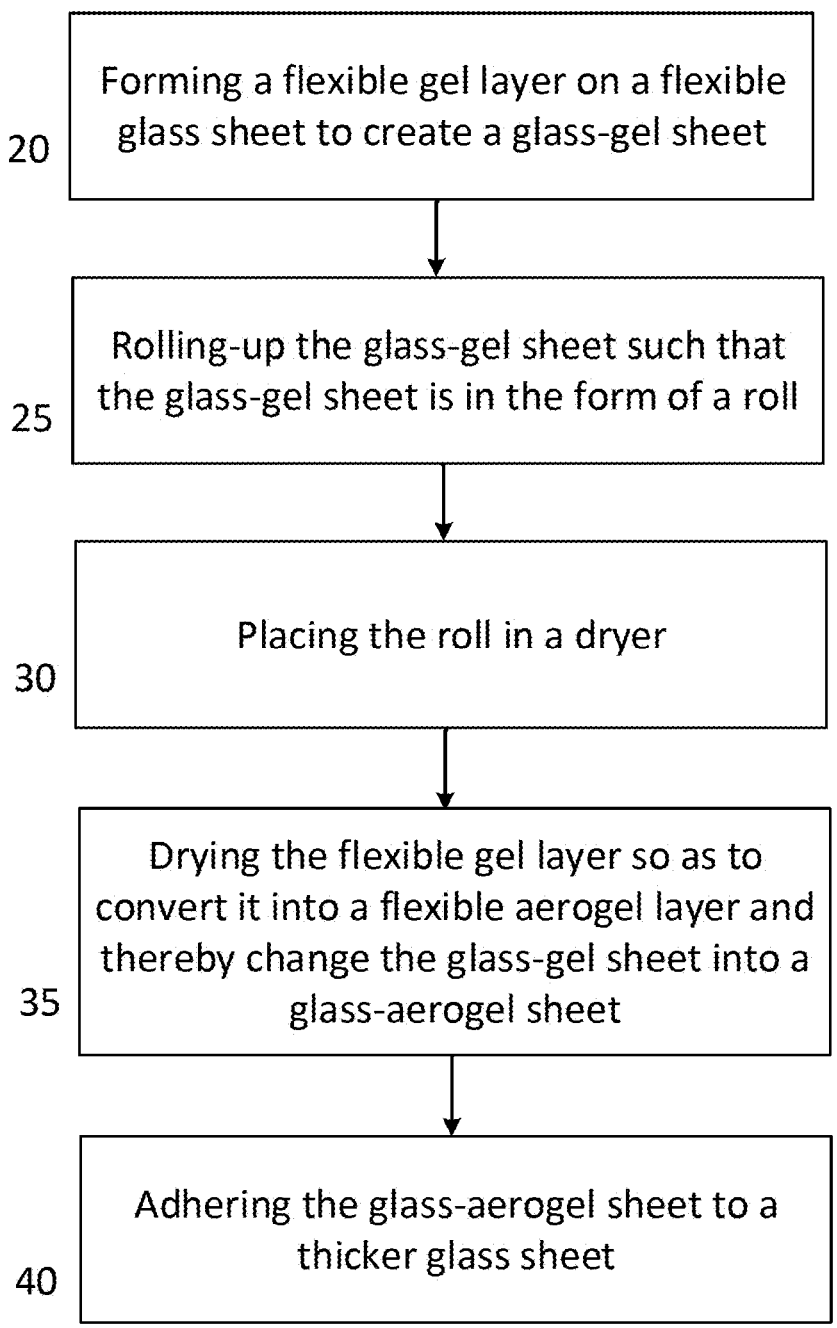
FIG. 1 is a flow chart of a method in accordance with certain embodiments.

Certain embodiments provide a method of processing glass. The method comprises forming a flexible gel layer on a flexible glass sheet to create a glass-gel sheet. The method further comprises rolling-up the glass-gel sheet such that the glass-gel sheet is in the form of a roll. Further yet, the method comprises placing the roll in a dryer, and drying the flexible gel layer so as to convert it into a flexible aerogel layer and thereby change the glass-gel sheet into a glass-aerogel sheet.

Some embodiments provide a glazing unit comprising first and second panes that are spaced-apart from each other. The glazing unit includes a glass-aerogel sheet located between the first and second panes. The glass-aerogel sheet comprises a flexible glass sheet and a flexible aerogel layer on the flexible glass sheet. The first and second panes each have thicknesses that are greater than a thickness of the flexible glass sheet.

Certain other embodiments provide a glass assembly comprising a glass pane, a flexible aerogel layer, and a flexible glass sheet. In such embodiments, the flexible aerogel layer is on the flexible glass sheet. In addition, the flexible glass sheet is laminated to the glass pane, such that a first side of an interlayer comprising a polymer adheres to the flexible glass sheet while an opposite, second side of the interlayer adheres to the glass pane.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Referring to the drawings, and starting with FIG. 1, there is shown a method of processing glass. The method comprises the steps of forming a flexible gel layer on a flexible glass sheet to create a glass-gel sheet (20); rolling-up the glass-gel sheet such that the glass-gel sheet is in the form of a roll (25); placing the roll in a dryer (30); and drying the flexible gel layer so as to convert it into a flexible aerogel layer (35) and thereby change the glass-gel sheet into a glass-aerogel sheet.

In some embodiments, the method further comprises adhering the glass-aerogel sheet 200 to a substrate 12. For example, as shown in FIG. 1, the method can involve the step of adhering the glass-aerogel sheet 200 to a thicker glass sheet (40), with the thicker glass sheet having a greater thickness than the flexible glass sheet. It is to be appreciated, however, that method step (40) is optional, and thus need not be performed in the method of FIG. 1.

When provided, the adhering step (40) can optionally comprise laminating the glass-aerogel sheet to the thicker glass sheet. In some embodiments of this nature, the laminating may involve adhering (e.g., bonding) a first side of an interlayer comprising a polymer to the flexible glass sheet and adhering (e.g., bonding) an opposite, second side of the interlayer to the thicker glass sheet. The polymer interlayer may be PVB, ionoplast plastic, or another conventional glass-lamination interlayer.

In other embodiments, a liquid adhesive may be used to adhere the glass-aerogel sheet 200 to the thicker glass sheet. In such cases, the adhesive is not applied as a solid sheet or film, but instead as glue that is applied to the glass-aerogel sheet 200, the thicker glass sheet, or both. Such glue is commercially available from Master Bond Inc. (Hackensack, New Jersey, U.S.A., sold under the trade name EP30LV-1) and Summers Optical (Hatfield, Pennsylvania, U.S.A., sold under the trade name Lens Bond). The glue can be applied in any conventional manner, such as by spraying or rolling it onto the glass-aerogel sheet 200 or the thicker glass sheet.

Figure 4:
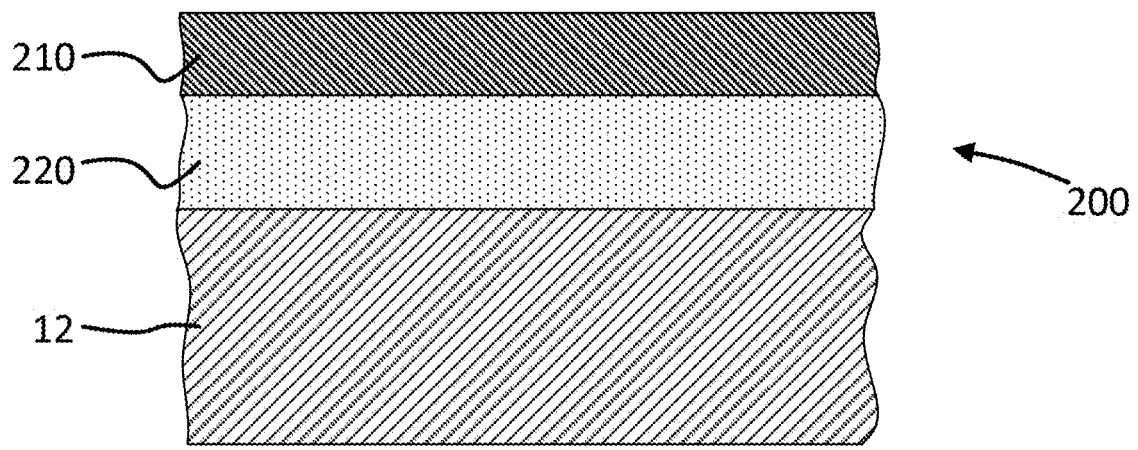
FIG. 4 is a schematic cross-sectional view of a glass-aerogel sheet on a substrate in accordance with other embodiments.

In still other embodiments, the glass-aerogel sheet 200 is adhered to the thicker glass sheet through (in some cases, solely through) van der Waals force. In embodiments of this nature, skilled artisans will appreciate that the glass-aerogel sheet 200 and the thicker glass sheet may be held together without using an adhesive or an interlayer between the aerogel layer and the thicker glass sheet. For example, the aerogel layer may be in contact with the thicker glass sheet and held thereto (either in part or solely) by van der Waals force. Reference is made to FIG. 4.

A variety of glass types can be used for the thicker glass sheet, such as soda-lime glass or borosilicate glass. In some cases, it may be desirable to use "white glass," a low iron glass, etc.

A variety of glass sizes can be used for the thicker glass sheet. Commonly, a large-area glass sheet is used. Certain embodiments involve the thicker glass sheet having a major dimension (e.g., a length or width) of at least about 0.5 meter, preferably at least about 1 meter (this can optionally be the case for any embodiment of the present invention), perhaps more preferably at least about 1.5 meters (e.g., between about 2 meters and about 4 meters), and in some cases at least about 3 meters.

Glass panes of various thicknesses can be used for the thicker glass sheet. In some embodiments, the thicker glass sheet has a thickness of about 1-8 mm. Certain embodiments involve a glass sheet with a thickness of greater than 2 mm (this can optionally be the case for any embodiment of the present disclosure), such as between about 2.3 mm and about 4.8 mm, and perhaps more preferably between about 2.5 mm and about 4.8 mm. In one particular embodiment, a glass pane (e.g., soda-lime glass) with a thickness of about 3 mm is used.

In some embodiments, the flexible glass sheet 210 has a thickness in a range of from 0.05 mm to 1 mm. Certain embodiments involve the flexible glass sheet 210 having a thickness of from 0.05 mm to 0.5 mm. In some cases, the flexible glass sheet 210 has a thickness in a range of from 0.05 mm to 1 mm in combination with the thicker glass sheet having a thickness of greater than 2 mm. These thickness ranges can be provided in any embodiment of the present disclosure. The thickness ranges described in this paragraph, however, are by no means limiting. Other thicknesses for the flexible glass sheet 210 and the thicker glass sheet can also be used.

The flexible glass sheet 210 and the flexible gel layer are sufficiently bendable so as to enable the glass-gel sheet 5 to be rolled-up into the form of a roll. In particular, the glass-gel sheet 5 preferably is characterized by a minimum bending radius of less than 200 mm, such as less than 175 mm, less than 150 mm, or even less than 125 mm. In more preferred embodiments, the minimum bending radius of the glass-gel sheet 5 is less than 100 mm, or even less than 50 mm.

The bending radius is measured at the inside curvature at the bending position of a material. The bending radius is defined as the minimum radius of the arc at the bending position where the material reaches the maximum deflection before breaking, cracking, or permanently deforming. The bending radius is determined by the thickness, the Young's modulus, and the strength of the material. A material that is thin, strong, and has a low Young's modulus has a lower bending radius and increased flexibility compared to a material that is thicker, weaker, and has a higher Young's modulus.

The glass-gel sheet 5 preferably is characterized by a flexural modulus of less than 100 MPa, such as less than 75 MPa, less than 50 MPa, less than 25 MPa, less than 20 MPa, less than 15 MPa, or even less than 10 MPa. In more preferred embodiments, the flexural modulus of the glass-gel sheet 5 is less than 5 MPa, or even less than 4 MPa.

The flexural modulus of a material is a mechanical property that measures a material's stiffness or resistance to bending and is defined as the ratio of stress to strain in flexural deformation. It is determined from the slope of a stress-strain curve produced by a flexural test, such as ASTM D790: Standard Test Methods for Flexural Properties of Unreinforced and Reinforced Plastics and Electrical Insulating Material, the contents of which are incorporated herein by reference. The higher the flexural modulus of a material, the harder it is to bend. Conversely, the lower the flexural modulus, the easier it is for the material to bend under an applied force.

As one non-limiting example, the flexible glass sheet 210 comprises borosilicate glass. Such glass is commercially available from Corning Incorporated and sold under the trade name Willow® Glass (Corning, New York, U.S.A.). However, any glass that is flexible enough to be rolled into the form of a roll could be used (e.g., chemically-toughened ultrathin glass), particularly if the glass sheet has a bending radius within any of the ranges noted in the previous paragraph. For example, in some cases, a thin aluminosilicate glass can be used, such as glass commercially available from SCHOTT AG and sold under the trade name Schott AS 87 eco (Mainz, Germany).

Preferably, the flexible glass sheet 210 has a non-porous face. In such cases, forming the flexible gel layer on the flexible glass sheet 210 may comprise forming the flexible gel layer on the non-porous face of the flexible glass sheet 210. The resulting aerogel layer 220 may thus be in contact with the non-porous face of the flexible glass sheet 210. This can optionally be the case for any embodiment of the present disclosure.

As used herein, the term "aerogel" refers to a material obtained by combining either a nonfluid colloidal network or a polymer network with a liquid so as to form a gel, and then removing the liquid from the gel and replacing the liquid with a gas or vacuum. As discussed below, the resulting aerogel (e.g., the preferred aerogel described herein) provides excellent insulating properties.

Skilled artisans will appreciate that aerogels are generally hydrophilic. As a result, when they absorb moisture, their structure may collapse and deteriorate to some degree. While aerogels can be made hydrophobic (e.g., via chemical treatment), even some modified aerogels may experience certain levels of degradation when subjected to moisture, although such levels may be acceptable. Thus, in embodiments where the flexible gel layer is formed on the non-porous face of a flexible glass sheet 210, the non-porous face of the flexible glass sheet 210 may ultimately help keep the resulting aerogel layer from absorbing moisture.

Preferably, the flexible glass sheet 210 is not partially or fully inside the flexible gel layer, but rather is located entirely alongside the flexible gel layer. In such cases, the flexible glass sheet 210 is not partially or fully embedded in (or otherwise incorporated into) the resulting flexible gel layer. This preferably is the case for all embodiments of the present disclosure. Or at least the flexible glass sheet is not embedded in the resulting aerogel layer to the extent that portions of the aerogel layer are on both sides of the flexible glass sheet.

In certain embodiments, after drying step 35, the flexible aerogel layer 220 is an outermost layer of the glass-aerogel sheet 200. In addition or alternatively, the glass-aerogel sheet 200 can optionally consist of the flexible glass sheet 210 and the flexible aerogel layer 220. This, however, need not be the case. For example, there can optionally be a coating or other layer between the flexible glass sheet and the flexible aerogel layer. Such coating or other layer may be provided for durability, improved adhesion, improved flexibility, to enhance gel or aerogel formation and/or to provide infrared reflection.

Figure 2:
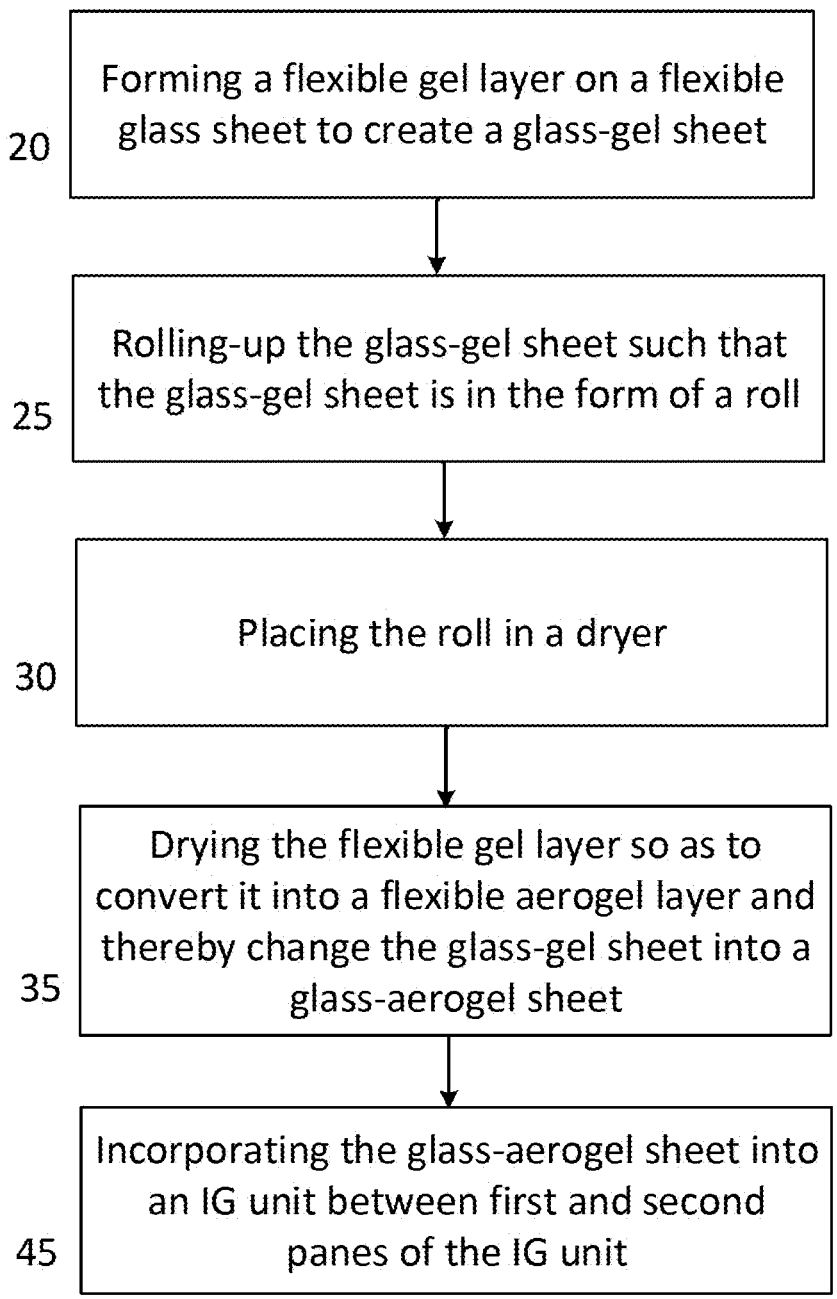
FIG. 2 is a flow chart of another method in accordance with certain embodiments.

In some cases, as shown in FIG. 2, the method further comprises the step of incorporating the glass-aerogel sheet into a multiple-pane insulating glass unit that includes first and second glass panes spaced-apart from each other (45). Preferably, incorporating the glass-aerogel sheet 200 into the multiple-pane insulating glass unit results in the glass-aerogel sheet being located between the first and second glass panes. The first and second glass panes can each have the same thicknesses described above for the thicker glass sheet. More generally, any conventional glass thicknesses can be used.

While the IG units shown in the figures may be considered double-pane units, triple-pane units can also be used.

In many embodiments, the glass-aerogel sheet 200 is devoid of an infrared-reflective film (e.g., a silver-containing film). The flexible glass sheet 210, for example, may be devoid of a coating comprising a metal film. However, as described in the previous paragraph, the glass-aerogel sheet 200 may be incorporated into a glazing or a multiple-pane insulating glass unit ("IG unit"). In such cases, the glazing or IG unit may (and in many cases, preferably does) include a low-emissivity coating on a pane surface different from the pane surface to which the glass-aerogel sheet 200 is adhered. More will be said of this later.

Figure 3:
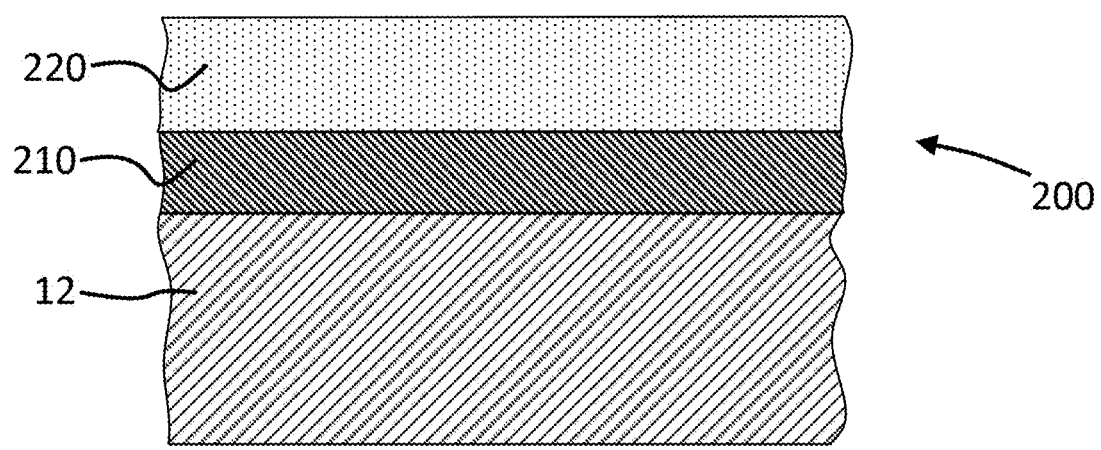
FIG. 3 is a schematic cross-sectional view of a glass-aerogel sheet on a substrate in accordance with certain embodiments.

Multiple arrangements for the flexible glass sheet 210 and the flexible aerogel layer 220 are possible. In some embodiments, the flexible glass sheet 210 is adjacent (e.g., on) the substrate 12, while the flexible aerogel layer 220 is adjacent (e.g., on) the flexible glass sheet 210 (FIG. 3). In embodiments of this nature, the flexible glass sheet 210 is located between the substrate 12 and the flexible aerogel layer 220. While not shown in FIG. 3, it is to be appreciated that a polymer interlayer (e.g., PVB) or an adhesive (e.g., transparent glue) may be provided between the substrate 12 and the flexible glass sheet 210. In other embodiments, the flexible aerogel layer 220 is adjacent (e.g., on) the substrate 12, while the flexible glass sheet 210 is adjacent (e.g., on) the flexible aerogel layer 220 (FIG. 4). In these embodiments, the aerogel layer 220 may be held to the flexible glass sheet 210 by van der Waals force. Or a transparent adhesive may be used.

The aerogel 200 of the present disclosure can comprise (e.g., can be) either a silica-based aerogel or a polymer-based aerogel. In some cases, the aerogel is a cellulose-based aerogel.

In many embodiments, the flexible aerogel layer 220 comprises a polymer, such as an organic polymer. In preferred embodiments, the flexible aerogel layer 220 comprises cellulose. This can optionally be the case for any embodiment of the present disclosure. Aerogels of this nature are described in International PCT Patent Application No. PCT/US2019/037122, the teachings of which are incorporated herein by reference. The aerogel can contain cellulosic nanocomposites that are aligned in ordered liquid crystal phases.

The flexible aerogel layer 220 can be made by any process suitable to form sufficiently flexible aerogel, such as the flexible aerogels that are described in International PCT Patent Application No. PCT/US2019/037122. The flexibility of such cellulose aerogels, in particular, depends on various factors, such as the shape (fiber, ribbon, rod, etc.) and dimensions of the cellulose nanoparticles, and how the aerogel is chemically modified, crosslinked, and processed as a hydrogel. In some cases, a suitably flexible aerogel has cellulose nanoparticles with a width in dimensions of nanometers and a length in the nanometer to micron range.

As described in more detail below, aerogel is formed in a multi-step process. First, a hydrogel is formed (e.g., deposited) on a substrate. Next, the hydrogel undergoes a solvent exchange to remove its water content, thereby converting the hydrogel into an alcogel. The alcogel is then dried to remove the solvent(s), thereby converting the alcogel into an aerogel.

In some cases, the hydrogel is deposited on the flexible glass sheet when the flexible glass sheet is in a flat (i.e., planar) configuration. Thereafter, the flexible glass sheet can be rolled up (i.e., into the form of a roll) when the hydrogel is either fully cured or only partially cured. The solvent exchange can occur when the glass sheet is in either a rolled or flat configuration. Generally, the drying step can occur when the glass sheet is in either a rolled or a flat configuration. Although by no means limiting, one prophetic example of preparing a suitably flexible aerogel on a flexible glass sheet follows.

Cellulose nanofibers can be produced through the oxidation of native cellulose using (2,2,6,6-Tetramethylpiperidin-1-yl)oxyl, commonly referred to as TEMPO. This process yields TEMPO-oxidized cellulose (TOCNs) with widths that can optionally be around 5 nm and lengths that can optionally be around 2 microns. The TEMPO-catalyzed oxidation process is well-known in the literature. These TOCNs can then be dispersed in solution via sonification, filtered to 10 microns, and concentrated in a rotary evaporator. The surfaces of TOCNs can then be modified by covalently bonding quaternary amines via amidation with carbamoylcholine chloride in a solution of 0.1 vol % 1-[Bis(dimethylamino) methylene]1H-1,2,3-triazolo[4,5-b]pyridinium 3-oxid hexafluorophosphate, 0.005 vol % N,N-Diisopropylethylamine, 0.01 vol % Dimethylformamide, and 2 vol % carbamoylcholine chloride. Thereafter, a hydrogel can be formed by crosslinking the TOCNs with polysiloxane by creating a well-dispersed solution of 14 vol % TOCN solution, 3 vol % cetrimonium bromide (CTAB), 20 vol % urea, 7 vol % methyltrimethoxysilane, and 0.4 vol % acetic acid in water, and allowing the solution to age for 48 hours. After that, the hydrogel can be processed in a conventional manner for conversion to an aerogel (e.g., using solvent exchange to form an alcogel, followed by $CO_2$ supercritical drying).

The glass-gel sheet 5 can be formed by loading a roll of thin glass (such as 0.1 mm thick Willow glass from Corning) on a roll-to-roll coater, preparing the hydrogel, and dispensing the partially cured hydrogel onto the glass before it has set. The hydrogel can be held on the glass surface using temporary barriers or dams (such as long plastic strips, or square tubing) that are put on the edges of the glass sheet before the hydrogel, and removed after the hydrogel is fully cured. In some cases, the barriers can be attached to the roll-to-roll coater, rather than to the glass surface. Alternatively, the hydrogel may be allowed to flow all the way to, or even over, the edge of the glass. Some portion of the resulting gel near the edge may later be removed, e.g., when it is still a hydrogel, or when it is an alcogel or aerogel. In some cases, the hydrogel may be dispensed at a high enough viscosity that it does not substantially flow after being deposited. The hydrogel may be either fully or partially cured before it is rolled back up. The glass-gel sheet 5 can then go through solvent exchange to form an alcogel, and then undergo a drying process to remove the solvents (e.g., using a supercritical dryer).

The flexible aerogel layer 220 is provided in the form of one or more aerogel sheets 230. This is in contrast to aerogel in flowable granular or other particulate form. The aerogel sheet(s) preferably are self-supporting, i.e., once fully synthesized and formed, the sheet(s) can retain their sheet form without being adhered to glass or another support. It is to be appreciated, however, that once incorporated into a glazing unit 10, the aerogel layer 220 preferably is supported by one of the panes. As exemplified in FIG. 6, the glazing unit 10 preferably does not include (i.e., is devoid of) any cell or honeycomb structure surrounding/containing particulate aerogel. The flexible aerogel layer 220 preferably is both self-supporting and sufficiently flexible to be wound. Moreover, the glass-aerogel sheet 200 preferably is sufficiently flexible to be wound.

When multiple aerogel sheets 230 are used, they can optionally be arranged in a tiled configuration between two panes 100, 110 of a glazing unit 10. When the flexible aerogel layer 220 comprises a plurality of aerogel sheets, those sheets can have any desired shape and tiling arrangement. As non-limiting examples, the aerogel sheets can be square, rectangular, or hexagonal in shape. In some embodiments, edges of each aerogel sheet are aligned both vertically and horizontally with edges of adjacent aerogel sheets. Reference is made to U.S. Patent Application No. 63/062, 910, the teachings of which relating to aerogel sheet tiling arrangements are hereby incorporated by reference. Certain spacing of adjacent edges of aerogel sheets can, for example, be provided, as detailed in the noted '910 application.

When multiple aerogel sheets are provided in a tiling arrangement, the size of the aerogel sheets is not particularly limited. In some cases, all the aerogel sheets have the same dimensions. In other cases, some of the aerogel sheets have different dimensions (e.g., a greater length) compared to some of the other aerogel sheets. Preferably, each of the aerogel sheets has a length and a width of at least 10 cm. For each of the aerogel sheets, the length, the width, or both preferably are less than 1 meter. Larger or smaller aerogel sheets may alternatively be used.

In some cases, there is only one layer/thickness of aerogel, rather than having one aerogel sheet on top of another. This can optionally be the case for any embodiment of the present disclosure. In other cases, however, the aerogel layer comprises first and second aerogel sheets positioned one on top of the other. Such sheets may have different compositions from each other, different thicknesses from each other, or both.

The aerogel layer 220 has a thickness T. In some embodiments, the aerogel layer 220 has a thickness in a range of from 1 mm to 15 mm, such as greater than 2 mm but less than 8 mm, or from 2 mm to 5 mm (e.g., 3 mm). For any embodiment of the present disclosure, the thickness T can optionally be in any one or more (e.g., all) of the ranges noted in this paragraph. It is to be appreciated, however, that other thicknesses can be used in certain embodiments. All thicknesses reported herein are physical/geometric thicknesses, unless otherwise indicated.

The flexible aerogel layer 220 preferably is formed of materials, and made by a process, that allows the aerogel layer to have a haze of less than 4% (e.g., less than 3%, less than 2%, or even less than 1%). It is to be appreciated, however, that this haze level is optional. For example, higher haze levels may be suitable depending on the intended application.

Haze can be measured in well-known fashion, e.g., using a BYK Haze-Gard plus instrument. Reference is made to ASTM D 1003-00: Standard Test method for Haze and Luminous Transmittance of Transparent Plastics, the contents of which are incorporated herein by reference.

The flexible aerogel layer 220 preferably has a visible transmittance of greater than 90%. In certain preferred embodiments, the visible transmittance is greater than 92%, greater than 95%, or even up to 97%, for the flexible aerogel layer 220. For any embodiment of the present disclosure, the visible transmittance of the aerogel layer 220 preferably is in any one or more (e.g., all) of the ranges noted in this paragraph.

The term "visible transmittance" is well known in the art and is used herein in accordance with its well-known meaning to refer to the percentage of all incident visible radiation that is transmitted through an object (e.g., through the aerogel layer 220). Visible radiation constitutes the wavelength range of between about 380 nm and about 780 nm. Visible transmittance, as well as visible reflectance, can be determined in accordance with NFRC 300-2017, Standard Test Method for Determining the Solar and Infrared Optical Properties of Glazing Materials and Fading Resistance of Systems. The well-known LBNL WINDOW 7.4 computer program can be used in calculating these and other reported optical properties.

In addition, the flexible aerogel layer 220 has a low density. In certain embodiments, the flexible aerogel layer 220 has a density of less than 500 kg/m³. In some embodiments, the flexible aerogel layer 220 has a density of less than 255 kg/m³, such as less than 220 kg/m³, or even less than 200 kg/m³. Additionally or alternatively, the flexible aerogel layer 220 can optionally contain greater than 97% gas by volume. This can optionally be the case for any embodiment of the present disclosure.

The flexible aerogel layer 220 also has a low thermal conductivity. In some embodiments, the flexible aerogel layer 220 has a thermal conductivity at atmospheric pressure of less than 0.04 W/(mK) but greater than or equal to 0.006 W/(mK).

Because the glass-gel sheet 5 can be rolled into a compact form for drying, the methods described herein can be used to facilitate manufacturing large-size aerogels. In some cases, the roll 208 formed in step 20 has a height H (see FIG. 5A) of at least 36 inches. In certain embodiments, the height H of the roll 208 is in a range of from 36 inches to 96 inches.

In preferred embodiments, the roll 208 is a self-supporting roll (i.e., it is not on a reel, spool, or other support). This is perhaps best shown in FIG. 5A. However, this is not required in all embodiments, and in some cases, the roll is provided on a reel or other support.

Figure 5A:
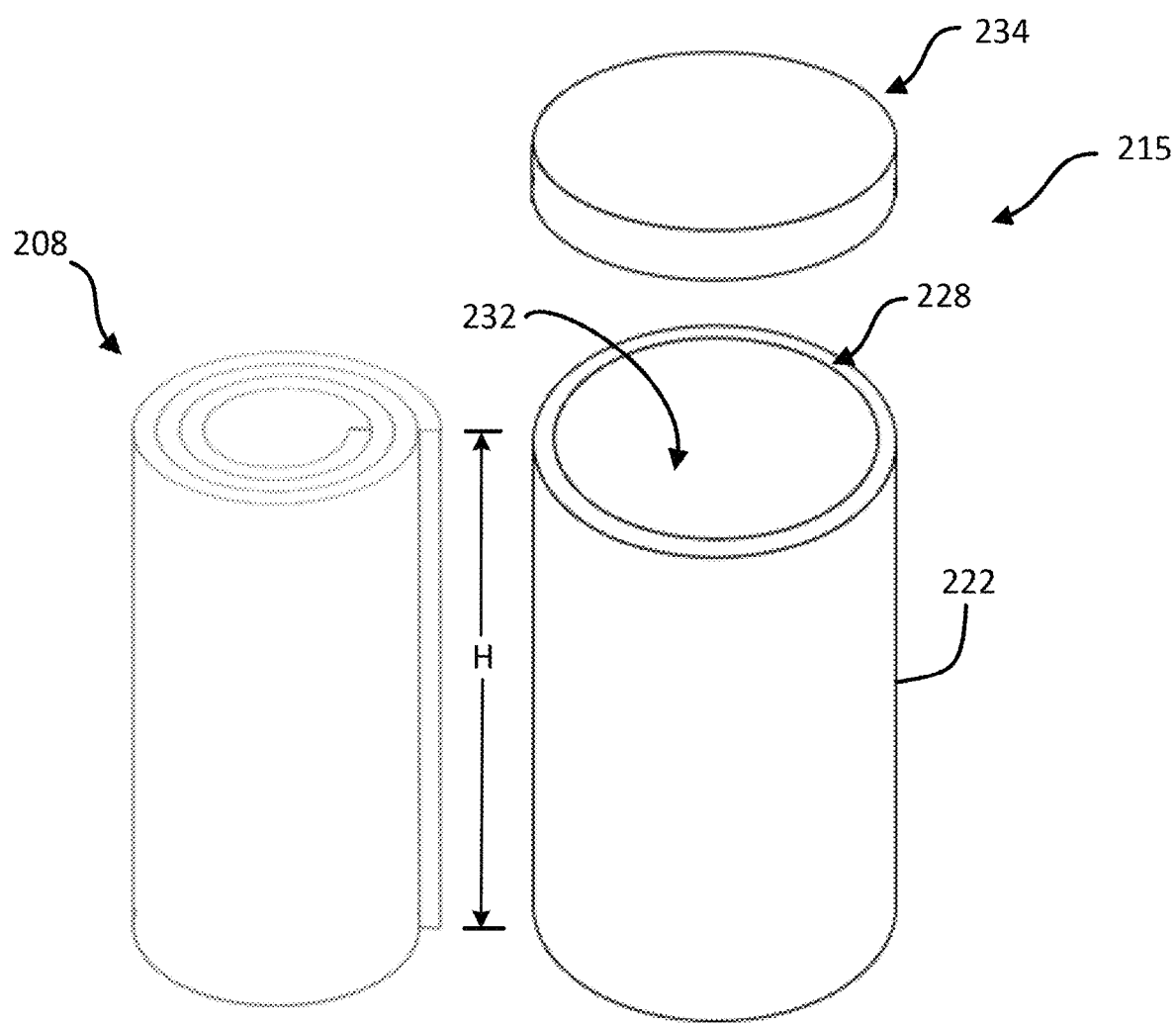
FIG. 5A is a schematic illustration of a glass-gel sheet that is in the form of a roll and located next to a dryer in accordance with certain embodiments.
Figure 5B:
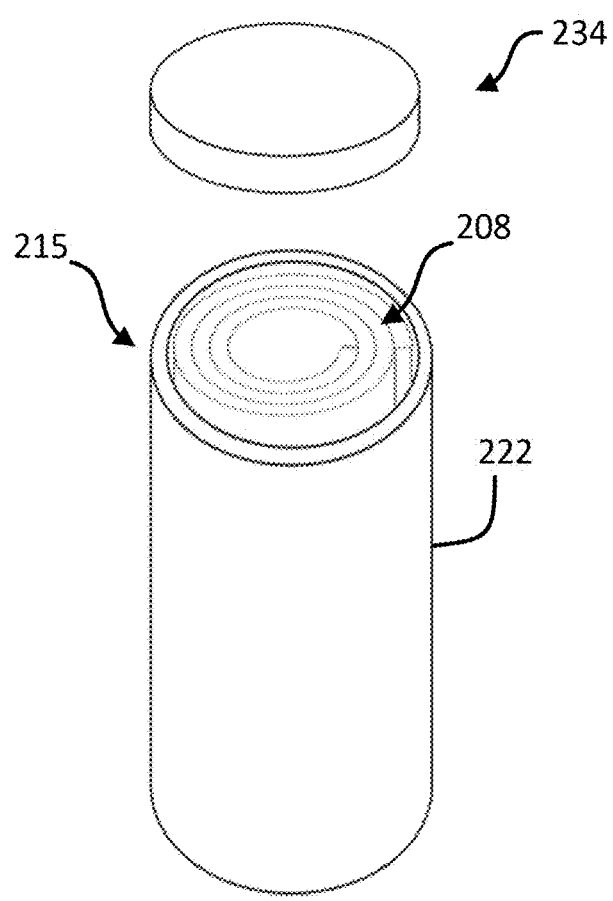
FIG. 5B is a schematic illustration of the roll and dryer shown in FIG. 5A, except showing the roll positioned in the dryer.
Figure 5C:
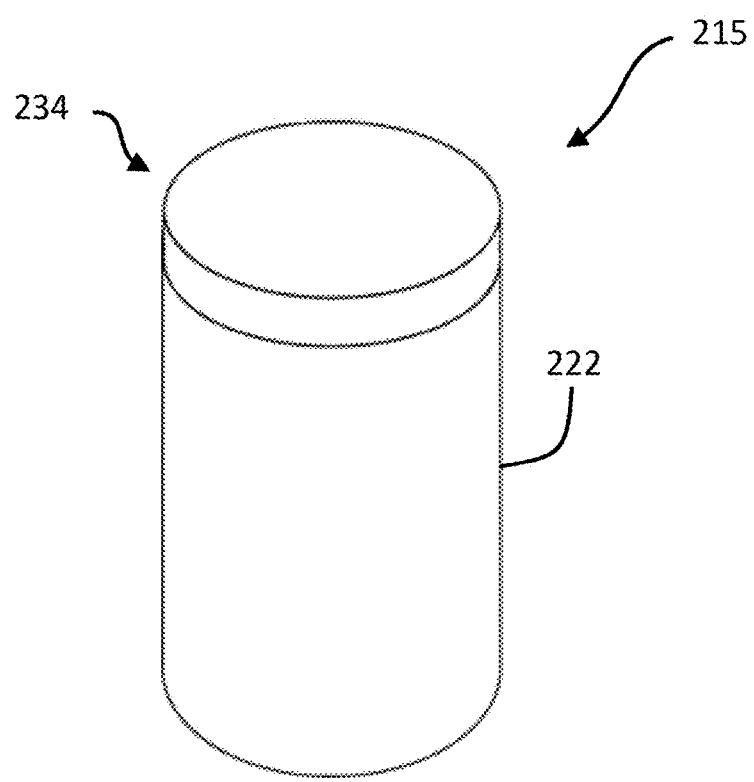
FIG. 5C is a schematic illustration of the dryer shown in FIGS. 5A and 5B, showing the dryer in a closed configuration.

In some embodiments, the dryer 215 used in drying step 35 comprises a chamber (or "chamber housing") 222 and a lid 234. The chamber 222 has an opening 228 configured to provide access to an interior 232 of the chamber 222, and the lid 234 is configured to selectively close the opening 228. An exemplary dryer 215 is schematically shown in FIGS. 5A-5C. Specifically, FIG. 5A shows the roll 208 next to the dryer 215; FIG. 5B shows the roll 208 positioned in the dryer 215 (i.e., after the roll 208 has been placed in the interior 232 of the chamber 222 through the opening 228); and FIG. 5C shows the dryer 215 in a closed configuration, with the lid 234 selectively closing the opening 228 (e.g., after the roll 208 has been placed into the chamber 222).

In certain embodiments, the lid 234 is removably couplable to the chamber 222 such that the lid 234 can be detached (i.e., entirely separated) from the chamber 222 when desired. This, however, is not required in all embodiments. Skilled artisans will appreciate that any configuration can be used that allows the lid 234 to selectively close the opening 228 so as to maintain a desired temperature inside the chamber 222. For example, in some cases, the lid 234 may instead be hingedly coupled to the chamber 222.

In many cases, the dryer 215 is either a freeze dryer, a supercritical dryer, or an ambient dryer. In such instances, the step 35 of drying the flexible gel layer comprises either a freeze-drying process, a supercritical drying process, or an ambient drying process.

As used herein, ambient drying involves drying the flexible gel layer under ambient conditions (e.g., at a temperature in a range of from about 50 degrees to about 85 degrees Fahrenheit, and more typically in a range of from 68 degrees to 72 degrees Fahrenheit).

Preferably, the dryer 215 is configured to establish a controlled environment in its interior 232. This may involve a controlled temperature, a controlled pressure, a controlled airflow, a controlled humidity, or any combination thereof.

In cases where the dryer 215 is a supercritical dryer, drying the flexible gel layer comprises a supercritical drying process that includes delivering liquid $CO_2$ into the supercritical dryer. As is well-known to skilled artisans, supercritical drying involves a solvent exchange. Specifically, the water initially inside the gel layer is replaced with a suitable organic solvent (e.g., methanol, ethanol, or acetone). Then, when the flexible gel layer is soaked in liquid $CO_2$, the liquid $CO_2$ replaces the organic solvent and can be supercritically extracted.

In cases where the dryer 215 is a freeze dryer, any suitable freezing technique known in the art may be used. As non-limiting examples, the flexible gel layer can be placed into a household freezer, liquid nitrogen, or in a cryogenic mixture (e.g., a dry-ice/solvent mixture, such as a dry-ice and acetone bath).

FIG. 6 shows one example of a glazing unit of the present disclosure generally represented by reference numeral 10. The illustrated glazing unit 10 is an insulating glazing unit ("IG unit") 40 comprising first 100 and second 110 panes that are spaced-apart from each other and have a between-pane space 50 located between them. In certain embodiments (e.g., where the glazing unit 10 is mounted in a frame), the glazing unit 10 is part of a window, door, skylight, or other glazing.

In some embodiments, the first 100 and second 110 panes comprise glass. Any of the glass types and dimensions discussed above for the thicker glass sheet can be used for the first 100 and/or second 110 panes. In alternative embodiments, one or both panes 100, 110 comprise a polymer, such as polycarbonate. Various other polymer materials may also be used.

The glazing unit 10 includes a glass-aerogel sheet 200, which preferably is located between first 100 and second 110 panes. The glass-aerogel sheet 200 comprises the flexible glass sheet 210 and the flexible aerogel layer 220. In certain embodiments, the glass-aerogel sheet 200 consists of the flexible glass sheet 210 and the flexible aerogel layer 220. This, however, is not required in all embodiments. For example, the glass-aerogel sheet 200 may include one or more additional coatings or layers.

In some embodiments like the one shown in FIG. 6, a gas gap G is located alongside the glass-aerogel sheet 200 (e.g., in a between-pane space 50 between the first 100 and second 110 panes). The gas gap G contains a gaseous atmosphere, and preferably comprises a thermally insulative gas, such as argon, krypton, or both. In some cases, the gaseous atmosphere comprises a mix of argon and air (e.g., 90% argon and 10% air). In other cases, the gaseous atmosphere comprises a mix of krypton and air. In still other cases, the gaseous atmosphere comprises a mix of argon, krypton, and air. In yet other cases, the gaseous atmosphere is simply air.

In some embodiments, the IG unit 40 includes a low-emissivity coating 70. In the embodiment of FIG. 6, the #2 surface (i.e., surface 120) bears the low-emissivity coating 70. In embodiments of this nature, the glass-aerogel sheet 200 can be adhered to the #3 surface (i.e., surface 130) such that the flexible aerogel layer 220 is spaced from the low-emissivity coating 70. Alternatively, the glass-aerogel sheet can be on the #2 surface while a low-emissivity or solar control coating is on the #3 surface. In certain preferred embodiments, the flexible aerogel layer 220 is spaced from the low-emissivity coating 70 by at least 2 mm but not more than 15 mm (e.g., by 4-15 mm, 5-12 mm, or 10-15 mm).

When provided, the low-emissivity coating 70 preferably includes at least one silver-inclusive film, which desirably contains more than 50% silver by weight (e.g., a metallic silver film). In certain preferred embodiments, the low-emissivity coating 70 includes three or more infrared-reflective films (e.g., silver-containing films). Low-emissivity coatings having three or more infrared-reflective films are described in U.S. patent application Ser. No. 11/546,152 and U.S. Pat. Nos. 7,572,511 and 7,572,510 and 7,572,509 and Ser. No. 11/545,211 and U.S. Pat. Nos. 7,342,716 and 7,339,728, the teachings of each of which are incorporated herein by reference. In some cases, the low-emissivity coating 70 includes four silver layers. In other cases, the low-emissivity coating is a "single silver" or "double silver" low-emissivity coating, which are well-known to skilled artisans. Advantageous coatings of this nature are commercially available from, for example, Cardinal CG Company (Eden Prairie, Minnesota, U.S.A.).

As shown in FIG. 6, the IG unit 40 can optionally further include a transparent conductive oxide (TCO) coating 85 on an exterior surface of one of the first and second panes 100, 110. This can optionally be the case for any embodiment of the present disclosure. In some cases, the glass-aerogel sheet 200 and the TCO coating 85 are both supported by (e.g., are on opposite surfaces of) the same pane.

When provided, the transparent conductive oxide coating 85 may comprise, consist essentially of, or consist of indium tin oxide ("ITO"). In alternate embodiments, zinc aluminum oxide, SnO:Sb, sputtered SnO:F, or another known TCO is used. Thus, in certain embodiments, the transparent conductive oxide coating 85 comprises (e.g., is) a sputtered film that includes tin (e.g., comprising tin oxide together with antimony, fluorine, or another dopant). In some cases, the TCO film (which either forms or is part of the transparent conductive oxide coating 85) includes carbon nanotubes. Preferably, the TCO film (which optionally comprises ITO) is provided at a thickness of 10,000 Å or less, such as between about 1,000 Å and about 7,000 Å, e.g., from 1,000 Å to 1,750 Å, such as about 1,300-1,600 Å. For any embodiment where the transparent conductive oxide coating 85 is provided, it can optionally comprise a TCO (e.g., ITO) film having a thickness of from 1,000 Å to 1,750 Å.

The transparent conductive oxide coating 85 can, for example, be a coating of the type described in any of U.S. Pat. No. 9,862,640 or 10,000,965 or 10,000,411 or Ser. No. 16/740,006, the teachings of which concerning the transparent conductive oxide coating are hereby incorporated herein by reference.

Thus, in some cases, the insulating glazing unit 40 includes both a transparent conductive oxide coating 85 and a low-emissivity coating 70. This, however, is not required in all embodiments. In some cases, the insulating glazing unit 40 includes the low-emissivity coating 70 but is devoid of the transparent conductive oxide coating 85. Thus, in the embodiments of FIGS. 6A and 6B, coating 85 can optionally be omitted.

Certain embodiments include a spacer 60 between the first 100 and second 110 panes. The spacer 60 can be adhered to the first 100 and second 110 panes by one or more beads of sealant 55, 58, as is conventional and well-known to skilled artisans. The spacer 60 may be a conventional metal channel spacer, e.g., formed of stainless steel or aluminum. Or, it can comprise polymer and metal, or just polymer (e.g., foam). In some cases, the spacer 60 is rigid. The spacer can alternatively be an integral part of a sash, frame, etc. so as to maintain the IG unit in the desired configuration. In some embodiments, the flexible aerogel layer 220 does not contact the spacer 60. For example, the flexible aerogel layer 220 may be separated (i.e., spaced apart) from the spacer 60 by about 1 mm to about 5 mm (e.g., about 2-4 mm, such as about 3 mm). When provided, the sealant between the spacer 60 and the two adjacent panes 100, 110 can also be spaced from (e.g., so as not to contact) the flexible aerogel layer 220. Similarly, the flexible glass sheet 210 can be spaced apart from the spacer 60 and the sealant between the spacer and the panes.

In FIG. 6, the spacer 60 is shown with a primary sealant 55 (e.g., comprising two beads of sealant on opposite sides of the spacer) and a secondary sealant 58. Another option is to omit the secondary sealant. Or, a single deposit of sealant can be provided along both sides of the spacer and on the outside wall of the spacer. Various other known sealant arrangements/systems can alternatively be used. In FIG. 6, the primary sealant 55 is spaced from the flexible aerogel layer 220, but is closer to the flexible aerogel layer 220 than is the secondary sealant 58.

In other cases, the spacer may be omitted while one or more beads of sealant (optionally together with a moisture vapor barrier) are provided about the perimeter of the unit so as to encompass the flexible aerogel layer. In some cases of this nature, the flexible aerogel layer itself assists in holding the first and second panes apart by the desired distance. In such cases, there may be no gas gap alongside the flexible aerogel layer.

In certain embodiments, the aerogel layer 220 is located between the flexible glass sheet 210 and the second pane 110. One example is shown in FIG. 6B. As discussed above, such arrangements may help prevent aerogel layer 220 from absorbing moisture (or at least reduce such moisture absorption).

The first 100 and second 110 panes each have thicknesses that are greater than a thickness of the flexible glass sheet 210. In some embodiments, the flexible glass sheet 210 has a thickness in a range of from 0.05 mm to 1 mm. In certain embodiments, the thickness of the flexible glass sheet 210 is in a range of from 0.05 mm to 0.5 mm. For any of the embodiments described in this paragraph, the first and second panes can optionally each have a thickness of greater than 2 mm, such as about 2.5 mm or about 3 mm. Skilled artisans will appreciate that the thickness ranges described in this paragraph are by no means limiting.

In certain embodiments, the glazing unit 10 is a double-pane insulating glazing unit, which includes two panes 100, 110 and has only one between-pane space 50. The between-pane space 50 is located between the two panes 100, 110. In embodiments of this nature, the glazing unit 10 is devoid of a third pane. In other embodiments, the glazing unit is a triple-pane insulating glazing unit that has a third pane and two between-pane spaces. In this context, the flexible glass sheet 210 is not counted when describing the glazing unit as either a double-pane or triple-pane unit.

Figure 8:
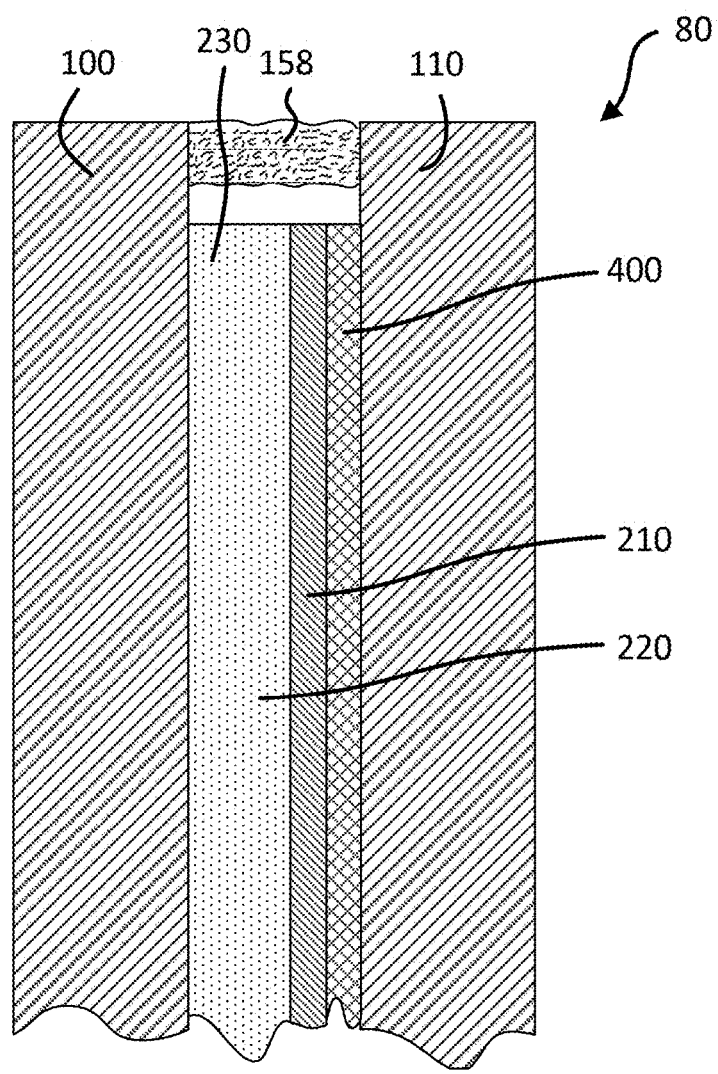
FIG. 8 is a schematic, broken-away, cross-sectional side view of a laminated glass assembly in accordance with certain embodiments of the invention.

In certain embodiments, the first 100 and second 110 panes are part of a laminated glass assembly 80 (e.g., a laminated glass panel) that further includes a polymer interlayer 400, the flexible glass sheet 210, and the flexible aerogel layer 220. Reference is made to FIG. 8. In some cases, a polymer interlayer adheres the glass-aerogel sheet to one pane (e.g., the second pane), while an optical adhesive adheres the glass-aerogel sheet to another pane (i.e., the first pane). In other cases, the laminated glass assembly is devoid of an optical adhesive. Thus, as noted elsewhere in this disclosure, van der Waals bonds may bond the aerogel layer 220 to a pane.

In some embodiments, the laminated glass assembly also includes a spacer. In other cases, the spacer is omitted (e.g., there is no metal spacer) and the laminated glass assembly only has one or more beads of sealant 158 (optionally provided with a moisture vapor barrier) at the perimeter of the assembly.

Some embodiments provide a laminated glass assembly where the flexible aerogel layer 220 contacts one of the glass panes 100, 110. This is shown in FIG. 8. In laminated embodiments of this nature, it is to be appreciated that there is no gas gap G between the glass-aerogel sheet and the first or second pane.

In certain embodiments, both panes 100, 110 can be clear 3 mm soda-lime float glass and the polymer interlayer 400 can be 0.30 inch thick PVB. It is to be appreciated, however, that these details are by no means limiting.

The polymer interlayer 400 preferably is a tear-resistant polymer layer. In some cases, it is a sheet of ionoplast plastic. In other cases, it is a sheet of polyvinyl butyral (PVB). Various other materials known to be suitable for the interlayer of a laminated glass panel can be used.

Thus, in certain laminated embodiments, the glass-aerogel sheet is laminated to one of the panes, and the aerogel layer contacts the other pane. If desired, the perimeter space between the two panes can be occupied (e.g., solely by) one or more beads of sealant, but no metal spacer. In some embodiments of this nature, the aerogel layer is held to pane 100 by van der Waals force, by adhesion from a perimeter sealant, or both. In the present embodiments, the aerogel layer can optionally be spaced from the perimeter sealant.

In many cases, a laminated glass assembly is produced through two operations: (1) an assembly operation, and (2) an autoclave operation. In the assembly operation, the interlayer is positioned between two glass substrates to form a sandwich, which is then heated (commonly to a temperature of between about 120° F. and about 170° F.) and roller pressed to initiate removal of air trapped between the interlayer and to initiate adhesion of the interlayer to the glass. In the autoclave operation, the sandwich is exposed to an elevated temperature (commonly between about 275° F. and about 300° F.) and an elevated atmospheric pressure (commonly between about 150 psig and about 190 psig) until there is complete adhesion of the interlayer to the glass and complete dissolution of air trapped within the interlayer. It is not uncommon for the autoclave operation to last two hours or four hours per treatment. Various autoclave and non-autoclave methods are known to skilled artisans.

In cases where conventional glass lamination pressures are used (such as the pressures described in the preceding paragraph), the aerogel is strong enough to avoid being crushed. There may, however, be complications when evacuating the high-pressure gas after lamination. Accordingly, in some cases, the lamination process is optimized so as to help protect the aerogel. For example, in certain embodiments, the evacuation step is slowed down to help ensure that the gas does not damage the aerogel when the gas escapes.

Figure 6A:
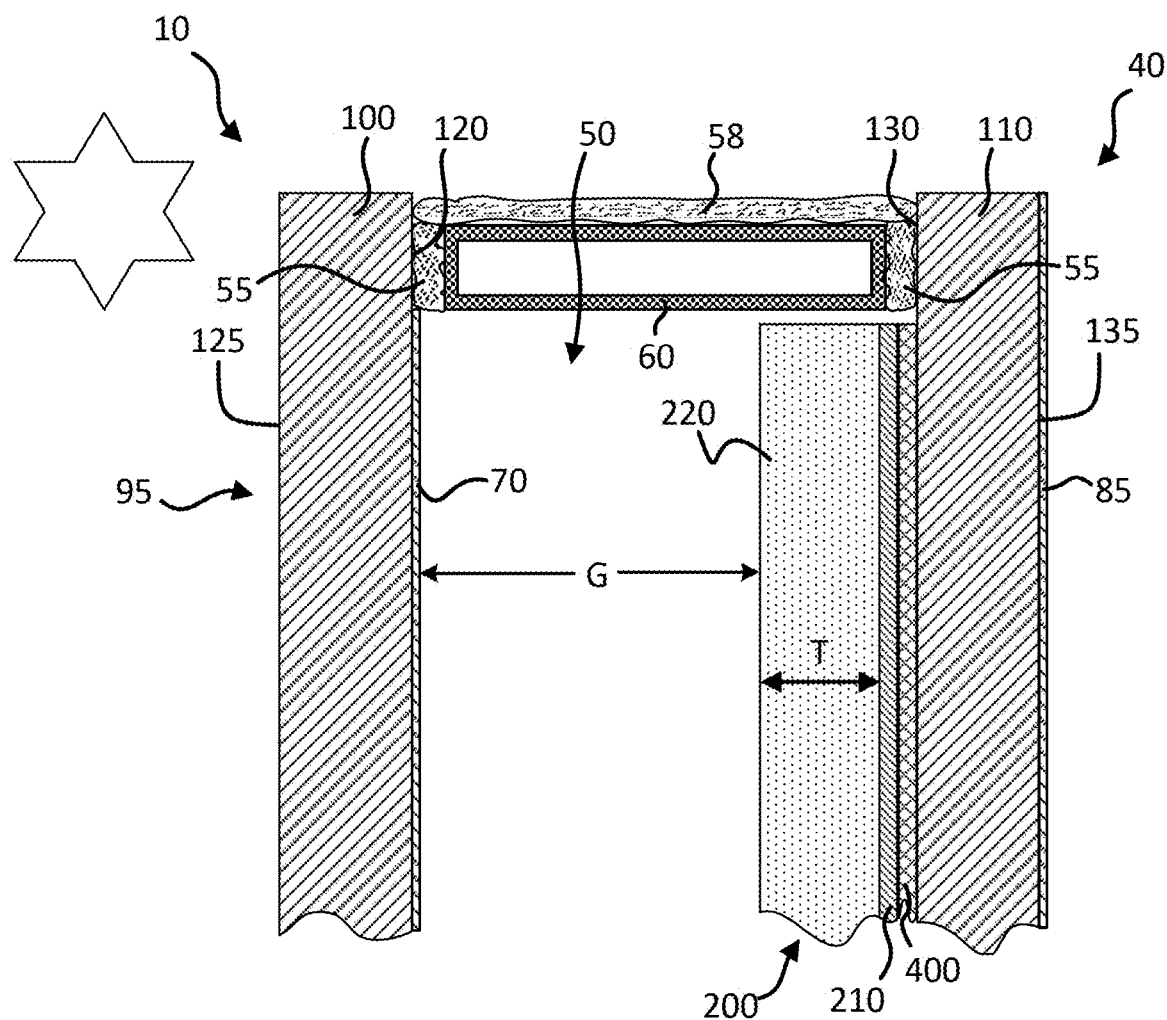
FIG. 6A is a schematic, broken-away, cross-sectional side view of a glazing unit in accordance with certain embodiments of the present invention.
Figure 6B:
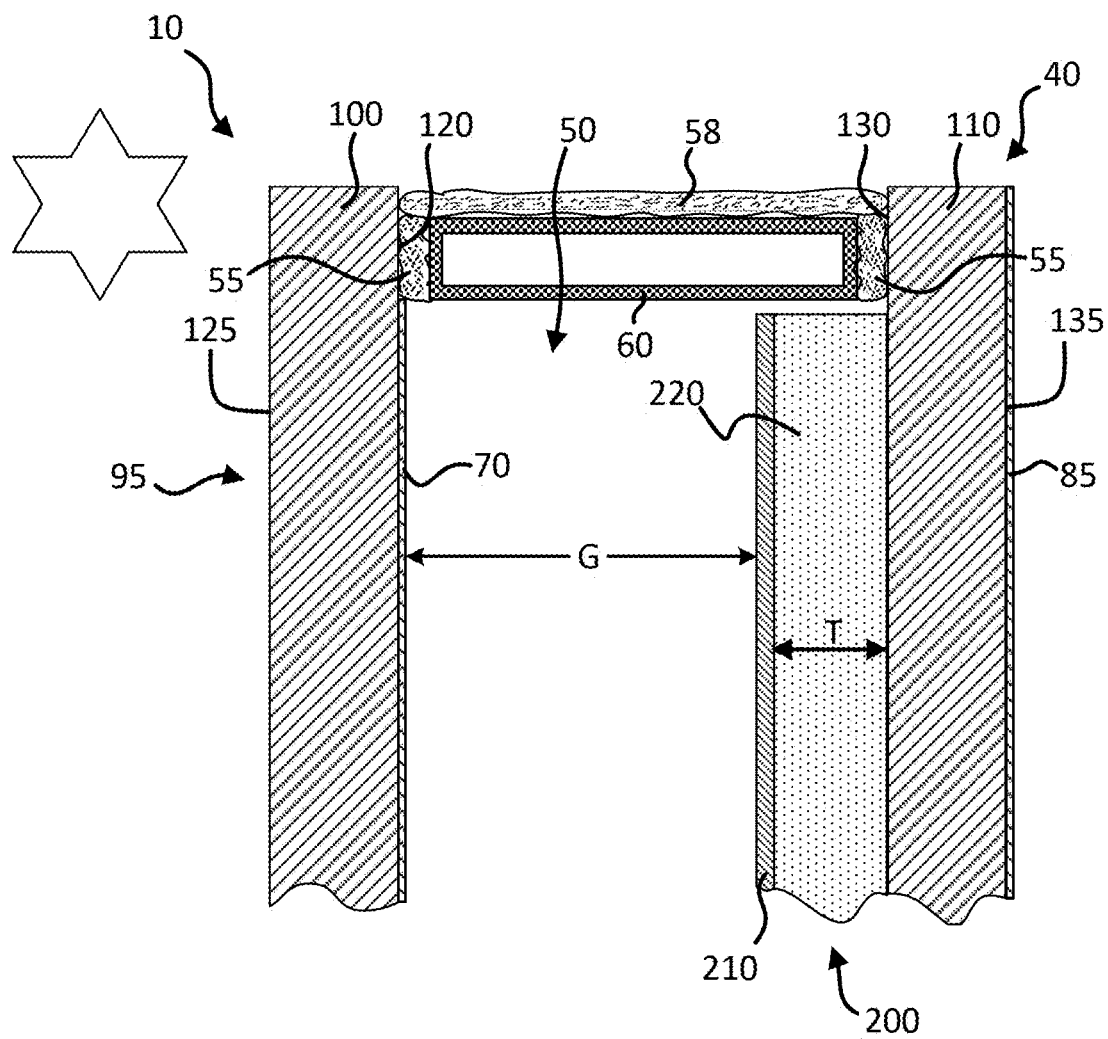
FIG. 6B is a schematic, broken-away, cross-sectional side view of another glazing unit in accordance with other embodiments of the present invention.

In embodiments such as FIG. 6A (where the aerogel layer of a glazing unit is exposed), a glass lamination resin can optionally be used to make cast laminated glass, rather than using an interlayer. Cast laminated glass resin is commercially available from various suppliers, such as Regalead (Manchester, United Kingdom; CadRam glass lamination system resin) or Scienstry, Inc. (Richardson, Texas, U.S.A., https://www.youtube.com/watch?v=THN86JxC1-E). Alternatively, in embodiments where the aerogel layer of a glazing unit is exposed, a temporary (e.g., non-adhered) cover sheet can be used over the aerogel during lamination.

In some embodiments involving a laminated glass assembly, there are two polymer interlayers. In such cases, the polymer interlayers are each in contact with one of the glass sheets on opposite sides of the glass-aerogel sheet. The interlayer/glass-aerogel sheet/interlayer arrangement may be assembled and laminated in a single operation, or it may be assembled in a separate operation prior to being laminated.

In other embodiments, there is only one polymer interlayer 400. In such embodiments, the flexible aerogel layer 220 preferably is in contact with one of the two glass sheets 100, 110. Reference is made to the non-limiting example of FIG. 8. In other embodiments, a polymer interlayer is adhered on one side to the aerogel layer and on the other side to one of the panes.

In still other embodiments, the polymer interlayer(s) are omitted, and the flexible aerogel layer 220 effectively replaces the interlayer(s) in the sandwich. In embodiments of this nature, a lamination process may still take place, but such lamination occurs at a lower pressure than it does for the other laminated embodiments.

In some cases, the laminated glass assembly 80 is made by a non-autoclave process. Reference is made to the exemplary non-autoclave processes described in U.S. Pat. Nos. 7,117,914 and 7,143,800, the teachings of which are hereby incorporated herein by reference.

While the present discussions focus on each pane 100, 110 being glass, other substrate types (e.g., polycarbonate or other polymeric materials) can alternatively be used.

Figure 7:
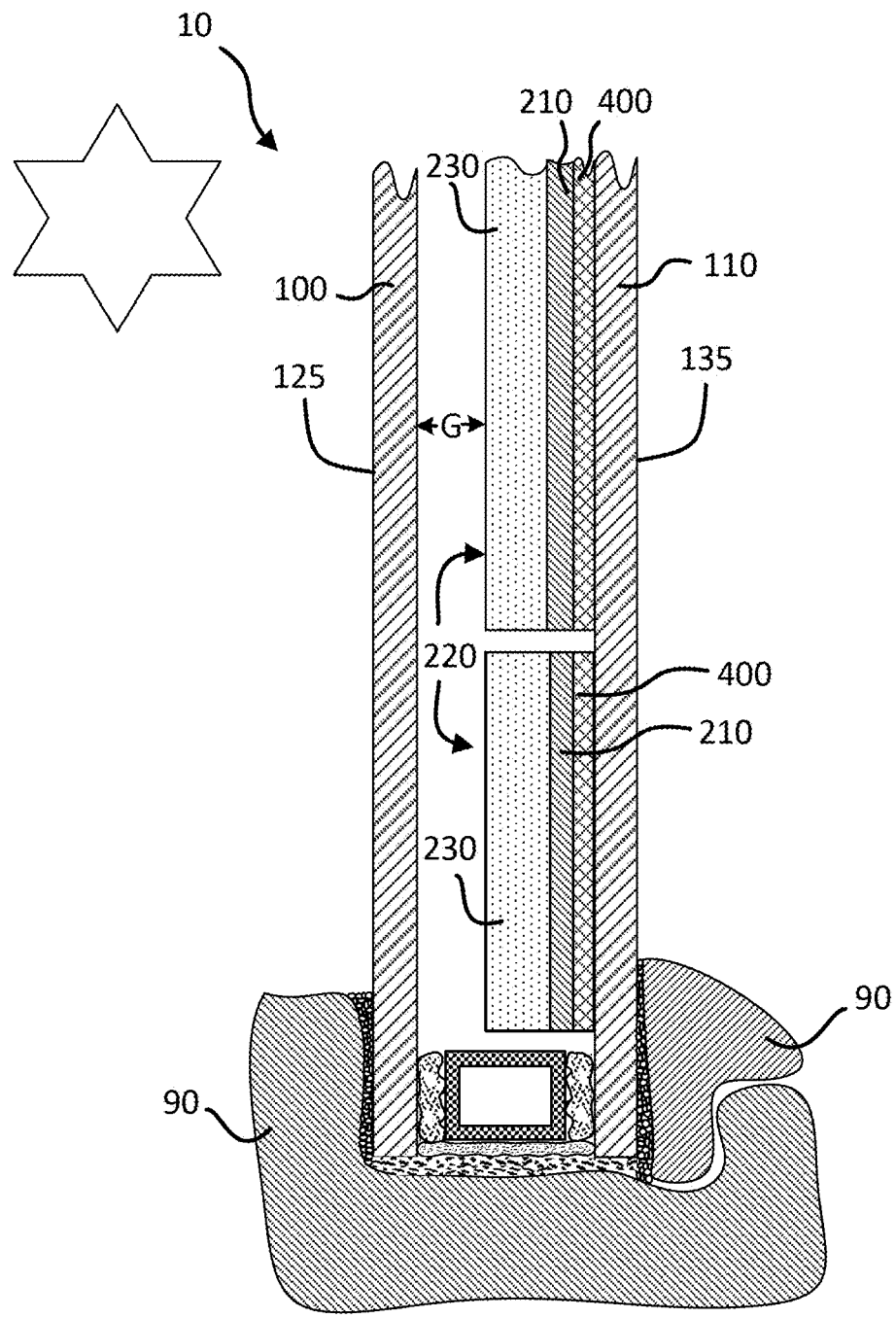
FIG. 7 is a schematic, broken-away, cross-sectional side view of an insulating glazing unit mounted in a frame in accordance with certain embodiments of the invention.

The first pane 100 has opposed surfaces (or "opposed faces") 120, 125, which preferably are opposed major surfaces. Similarly, the second pane 110 has opposed surfaces 130, 135, which preferably are opposed major surfaces. With respect to FIG. 6, surfaces 120 and 130 are confronting interior surfaces facing the between-pane space 50. In contrast, surfaces 125 and 135 are exterior surfaces facing away from the between-pane space 50. Preferably, surface 125 is configured to be an outboard surface exposed to an outdoor environment (and thus exposed to periodic contact with rain), while surface 135 may be configured to be an inboard surface exposed to an indoor environment within a house or another building. Accordingly, the first pane 100 preferably is configured to be an outboard pane, while the second pane 110 preferably is configured to be an inboard pane. The IG unit 40 can optionally be mounted in a frame 90 (as shown in FIG. 7), e.g., such that surface 125 is exposed to an outdoor environment, while surface 135 surface is exposed to an indoor environment.

As noted above, the glass-aerogel sheet 200 can be located in the between-pane space 50 of an IG unit. Preferably, the glass-aerogel sheet 200 is located on an interior surface 130 of a second pane 110. Examples are shown in FIGS. 6A, 6B, and 7. In other embodiments, the glass-aerogel sheet is on the interior surface of the first pane.

In certain embodiments, the flexible aerogel layer 220 is an outermost layer of the glass-aerogel sheet 200. This arrangement can be used, for example, in laminated embodiments where a strong lamination bond is provided between the flexible glass sheet 210 and the thicker glass pane. In some cases, the flexible glass sheet 210 is laminated to the second pane 110, such that a first side 405 of an interlayer 400 comprising a polymer (e.g., PVB or ionoplast) adheres to the flexible glass sheet 210 while an opposite, second side 410 of the interlayer 400 adheres to the second pane 110.

Various alternatives are possible. For example, the flexible glass sheet can alternatively be laminated to the first pane. Or, the flexible aerogel layer 220 can be an exposed outermost layer of the glass-aerogel sheet 200 in non-laminated embodiments, e.g., where interlayer 400 is replaced with an optical adhesive.

In some embodiments, the flexible aerogel layer 220 may be on (e.g., contacting) an interior surface of one of the two panes 100, 110, such that the flexible aerogel layer 220 is sandwiched between that pane and the flexible glass sheet 210. Such configurations may give the flexible aerogel layer 220 greater protection from the atmosphere in the between-pane space 50 due to the flexible glass sheet 210 covering the flexible aerogel layer 220. In addition, this configuration may provide increased durability for handling the subassembly of the flexible glass sheet 210 and the pane on which the flexible aerogel layer 220 is provided.

For the arrangement described in the previous paragraph, there may be one or more coatings or layers between the noted pane and the flexible aerogel layer. A coating or layer may be provided, for example, to adhere the aerogel to the pane. In some cases, a layer of optical adhesive is provided. Thus, the flexible aerogel layer preferably is carried alongside, and supported by, one of the panes. In cases where the optical adhesive is provided, portions of the flexible aerogel layer 220 optionally are devoid of the optical adhesive. In embodiments of this nature, the optical adhesive can be located at a perimeter of each aerogel sheet. An alternative arrangement is to provide the flexible aerogel layer on a suspended film mounted within the between-pane space, e.g., such that the film and the flexible aerogel layer are spaced apart from both panes.

In many embodiments, the glass-aerogel sheet 200 is devoid of an infrared-reflective metal film. In such cases, however, the glazing unit 10 may still have an infrared-reflective metal film. For example, the glass-aerogel sheet 200 may be on the second pane 110, while the first pane 100 has an interior surface 120 bearing a low-emissivity coating 70. In embodiments of this nature, the flexible aerogel layer 220 preferably is spaced apart from the low-emissivity coating 70.

Figure 9:
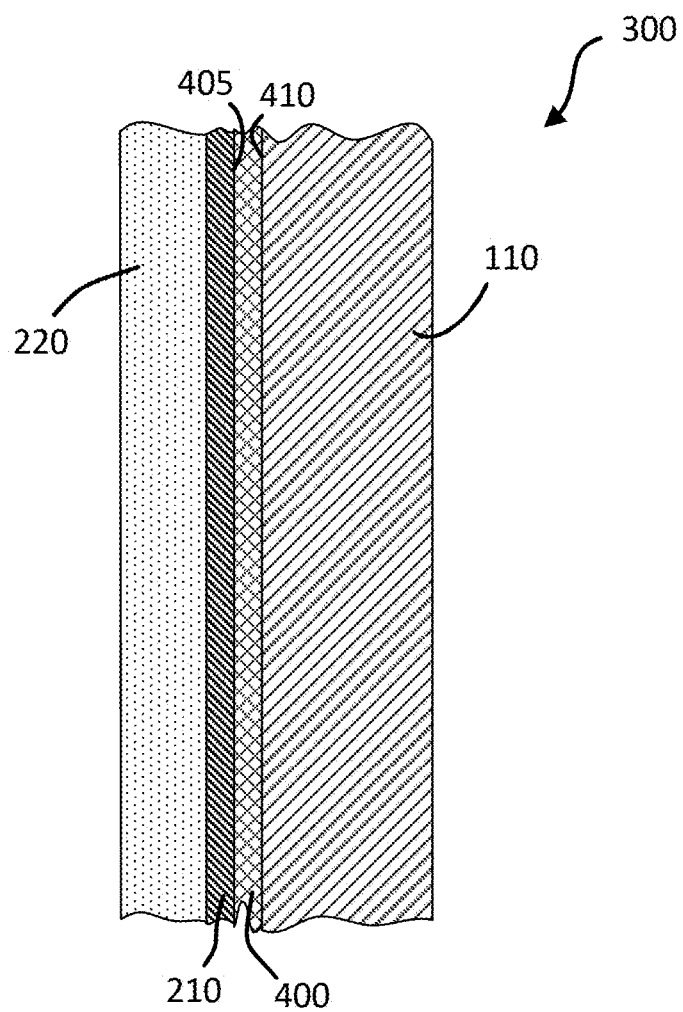
FIG. 9 is a schematic, broken-away, cross-sectional side view of a glass assembly in accordance with certain embodiments of the invention.

Certain other embodiments provide a glass assembly 300. The glass assembly 300 comprises a glass pane 110, a flexible glass sheet 210, and a flexible aerogel layer 220. In such embodiments, the flexible aerogel layer 220 is on (e.g., in contact with) the flexible glass sheet 210. If so desired, the flexible glass sheet 210 can be laminated to the glass pane 110, such that a first side 405 of an interlayer 400 comprising a polymer adheres to the flexible glass sheet 210 while an opposite, second side 410 of the interlayer 400 adheres to the glass pane 110. Reference is made to FIG. 9.

Figure 10:
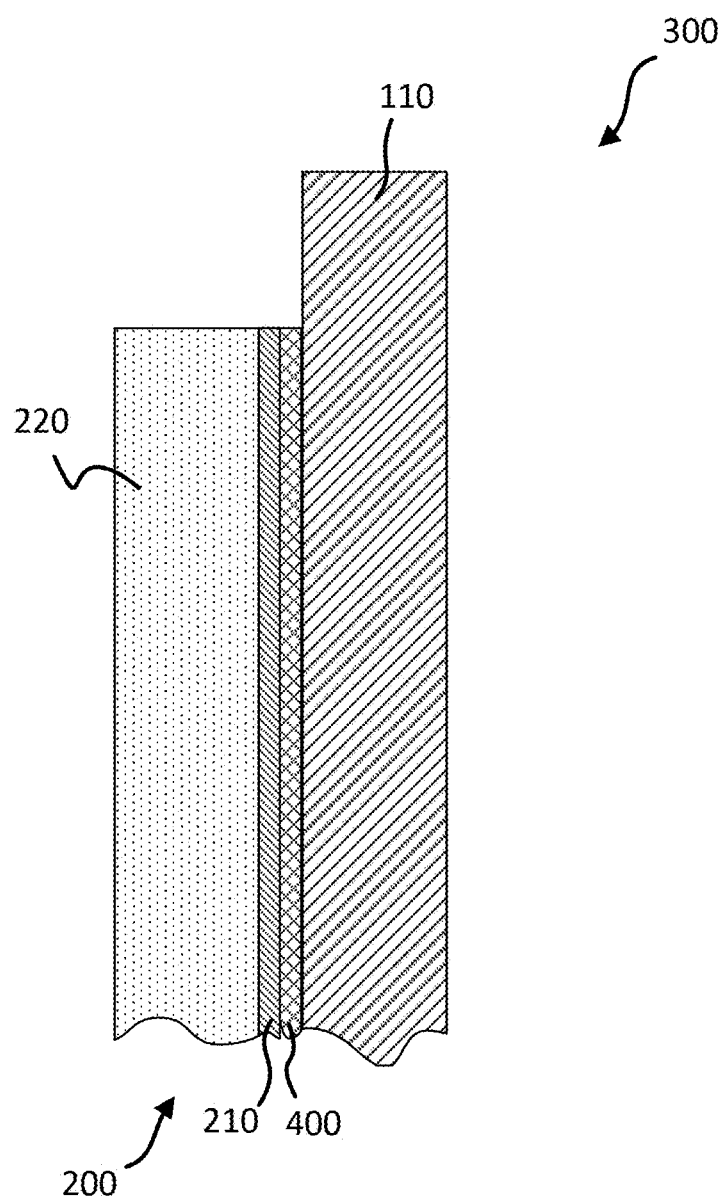
FIG. 10 is a schematic, broken-away, cross-sectional side view of another glass assembly in accordance with other embodiments of the invention.
Figure 11:
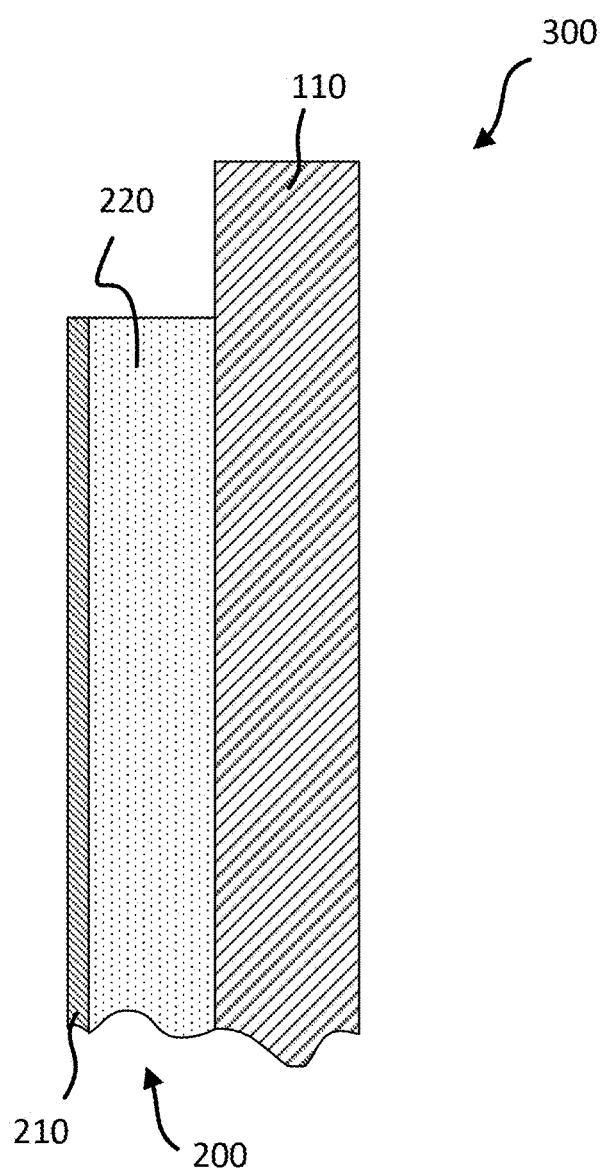
FIG. 11 is a schematic, broken-away, cross-sectional side view of yet another glass assembly in accordance with certain other embodiments of the invention.

FIGS. 10 and 11 show glass assemblies 300 wherein the glass-aerogel sheet 200 does not extend all the way to the perimeter edge of the glass pane 110. Instead, the perimeter edge of the glass-aerogel sheet 200 is spaced from the perimeter edge of the glass pane 110. An assembly of this nature is provided in various embodiments, such as those exemplified in FIGS. 10 and 11. Moreover, such an assembly 300 may be part of a multiple-pane IG unit 40, as exemplified by FIGS. 6A and 6B, or a laminated glass panel 80, as exemplified by FIG. 8.

When provided, the separation between the perimeter edge of the glass pane 110 and the perimeter edge of the glass-aerogel sheet may be greater than 1/32 inch, greater than 1/16 inch, greater than 1/8 inch, or even greater than 1/4 inch. In some cases, the separation ranges from 1/4 inch to 1 inch. The separation can extend entirely about the perimeter of the glass pane 110.

While some preferred embodiments of the invention have been described, it should be understood that various changes, adaptations and modifications may be made therein without departing from the spirit of the invention and the scope of the appended claims.

EMBODIMENTS

1. A method of processing glass, the method comprising:
forming a flexible gel layer on a flexible glass sheet to create a glass-gel sheet;
rolling-up the glass-gel sheet such that the glass-gel sheet is in the form of a roll; and
placing the roll in a dryer, and drying the flexible gel layer so as to convert it into a flexible aerogel layer and thereby change the glass-gel sheet into a glass-aerogel sheet.
2. The method of embodiment 1 wherein the glass-gel sheet is characterized by a minimum bending radius of less than 200 mm.
3. The method of embodiment 2 wherein the minimum bending radius of the glass-gel sheet is less than 100 mm.
4. The method of any of embodiments 1-3 wherein the flexible glass sheet has a non-porous face, and said forming the flexible gel layer on the flexible glass sheet comprises forming the flexible gel layer on the non-porous face of the flexible glass sheet.
5. The method of any of embodiments 1-4 wherein the flexible glass sheet is not partially or fully inside the flexible gel layer, but rather is located entirely alongside the flexible gel layer.
6. The method of any of embodiments 1-5 wherein the flexible glass sheet has a thickness in a range of from 0.05 mm to 1 mm.
7. The method of embodiment 6 wherein the thickness of the flexible glass sheet is in a range of from 0.05 mm to 0.5 mm.
8. The method of any of embodiments 1-7 wherein the roll is not on a reel or other support, but rather is a self-supporting roll.
9. The method of any of embodiments 1-8 wherein the roll has a height of at least 36 inches.
10. The method of embodiment 9 wherein the height of the roll is in a range of from 36 inches to 96 inches.
11. The method of any of embodiments 1-10 wherein the flexible aerogel layer comprises cellulose.
12. The method of any of embodiments 1-11 wherein the glass-gel sheet is characterized by a flexural modulus of less than 100 MPa.
13. The method of any of embodiments 1-12 wherein the dryer is either a freeze dryer, a supercritical dryer, or an ambient dryer, and said drying comprises either a freeze-drying process, a supercritical drying process, or an ambient drying process.
14. The method of embodiment 13 wherein the dryer is a supercritical dryer, and said drying comprises a supercritical drying process that includes delivering liquid $CO_2$ into the supercritical dryer.
15. The method of any of embodiments 1-14 wherein the flexible aerogel layer is an outermost layer of the glass-aerogel sheet.
16. The method of any of embodiments 1-15 wherein the glass-aerogel sheet is devoid of an infrared-reflective metal film.
17. The method of any of embodiments 1-16 wherein the glass-aerogel sheet consists of the flexible glass sheet and the flexible aerogel layer.
18. The method of any of embodiments 1-17 further comprising laminating the glass-aerogel sheet to a thicker glass sheet, wherein said laminating involves adhering a first side of an interlayer comprising a polymer to the flexible glass sheet and adhering an opposite, second side of the interlayer to the thicker glass sheet, the thicker glass sheet having a greater thickness than the flexible glass sheet.

19. The method of embodiment 18 wherein the flexible glass sheet has a thickness in a range of from 0.05 mm to 1 mm, and the thicker glass sheet has a thickness of greater than 2 mm.

20. The method of any of embodiments 1-19 further comprising incorporating the glass-aerogel sheet into a multiple-pane insulating glass unit that includes first and second glass panes spaced-apart from each other, wherein said incorporating the glass-aerogel sheet into the multiple-pane insulating glass unit results in the glass-aerogel sheet being located between the first and second glass panes.

21. The method of any of embodiments 1-20 further comprising adhering the glass-aerogel sheet to a thicker glass sheet using a liquid adhesive, the thicker glass sheet having a greater thickness than the flexible glass sheet.

22. A glazing unit comprising first and second panes that are spaced-apart from each other, the glazing unit including a glass-aerogel sheet located between the first and second panes, the glass-aerogel sheet comprising a flexible glass sheet and a flexible aerogel layer on the flexible glass sheet, the first and second panes each having thicknesses that are greater than a thickness of the flexible glass sheet.

23. The glazing unit of embodiment 22 wherein the thickness of the flexible glass sheet is in a range of from 0.05 mm to 1 mm, the first and second panes each having a thickness of greater than 2 mm.

24. The glazing unit of embodiment 22 or embodiment 23 wherein the thickness of the flexible glass sheet is in a range of from 0.05 mm to 0.5 mm.

25. The glazing unit of any of embodiments 22-24 wherein the first pane has an interior surface bearing a low-emissivity coating.

26. The glazing unit of any of embodiments 22-25 wherein the flexible glass sheet is laminated to the second pane, such that a first side of an interlayer comprising a polymer adheres to the flexible glass sheet while an opposite, second side of the interlayer adheres to the second pane.

27. The glazing unit of embodiment 25 or embodiment 26 wherein the flexible aerogel layer is spaced apart from the low-emissivity coating.

28. The glazing unit of any of embodiments 22-27 wherein the glass-aerogel sheet is characterized by a minimum bending radius of less than 200 mm.

29. The glazing unit of embodiment 28 wherein the minimum bending radius of the glass-aerogel sheet is less than 100 mm.

30. The glazing unit of any of embodiments 22-25 or any of embodiments 27-29 wherein the glass-aerogel sheet is adhered to the second pane by an adhesive.

31. The glazing unit of any of embodiments 22-30 wherein the flexible glass sheet has a non-porous face, and the flexible aerogel layer is on the non-porous face of the flexible glass sheet.

32. The glazing unit of any of embodiments 22-31 wherein the flexible glass sheet is not partially or fully inside the flexible aerogel layer, but rather is located entirely alongside the flexible aerogel layer.

33. The glazing unit of any of embodiments 22-32 wherein the flexible aerogel layer comprises cellulose.

34. The glazing unit of any of embodiments 22-33 wherein the glass-aerogel sheet is characterized by a flexural modulus of less than 100 MPa.

35. The glazing unit of any of embodiments 22-34 wherein the flexible aerogel layer is an outermost layer of the glass-aerogel sheet.

36. The glazing unit of any of embodiments 22-35 wherein the glass-aerogel sheet is devoid of an infrared-reflective metal film.

37. The glazing unit of any of embodiments 22-36 wherein the glass-aerogel sheet consists of the flexible glass sheet and the flexible aerogel layer.

38. A glass assembly comprising a glass pane, a flexible aerogel layer, and a flexible glass sheet, the flexible aerogel layer being on the flexible glass sheet, the flexible glass sheet being laminated to the glass pane, such that a first side of an interlayer comprising a polymer adheres to the flexible glass sheet while an opposite, second side of the interlayer adheres to the glass pane.

39. The glass assembly of embodiment 38 wherein the flexible glass sheet has a thickness in a range of from 0.05 mm to 1 mm, the glass pane having a thickness of greater than 2 mm.

40. The glass assembly of embodiment 38 or embodiment 39 wherein the thickness of the flexible glass sheet is in a range of from 0.05 mm to 0.5 mm.

41. The glass assembly of any of the embodiments 38-40 wherein the flexible aerogel layer and the flexible glass sheet together form a glass-aerogel sheet, the glass-aerogel sheet characterized by a minimum bending radius of less than 200 mm.

42. The glass assembly of embodiment 41 wherein the minimum bending radius of the glass-aerogel sheet is less than 100 mm.

43. The glass assembly of any of the embodiments 38-42 wherein the flexible glass sheet has a non-porous face, and the flexible aerogel layer is on the non-porous face of the flexible glass sheet.

44. The glass assembly of any of the embodiments 38-43 wherein the flexible glass sheet is not partially or fully inside the flexible aerogel layer, but rather is located entirely alongside the flexible aerogel layer.

45. The glass assembly of any of the embodiments 38-44 wherein the flexible aerogel layer comprises cellulose.

46. The glass assembly of any of the embodiments 38-45 wherein the flexible aerogel layer and the flexible glass sheet together form a glass-aerogel sheet, the glass-aerogel sheet characterized by a flexural modulus of less than 100 MPa.

47. The glass assembly of any of the embodiments 38-46 wherein the flexible aerogel layer and the flexible glass sheet together form a glass-aerogel sheet, and the flexible aerogel layer is an outermost layer of the glass-aerogel sheet.

48. The glass assembly of any of the embodiments 38-47 wherein the flexible aerogel layer and the flexible glass sheet together form a glass-aerogel sheet, and the glass-aerogel sheet is devoid of an infrared-reflective metal film.

49. The glass assembly of any of the embodiments 38-48 wherein the glass-aerogel sheet consists of the flexible glass sheet and the flexible aerogel layer.

50. The method of any of embodiments 1-17, 19, or 20 further comprising adhering the glass-aerogel sheet to a thicker glass sheet without using an adhesive or an interlayer, by applying the glass-aerogel sheet to the thicker glass sheet such that the flexible aerogel layer is in contact with the thicker glass sheet and is held thereto by van der Waals force, the thicker glass sheet having a greater thickness than the flexible glass sheet.

51. The glazing unit of any of embodiments 22-25, 27-29, or 31-37 wherein the glass-aerogel sheet is adhered to the second pane without using an adhesive or an interlayer.

What is claimed is:

1. A method of processing glass, the method comprising: forming a flexible gel layer on a flexible glass sheet to create a glass-gel sheet, wherein the flexible glass sheet is not partially or fully inside the flexible gel layer but rather is located entirely alongside the flexible gel layer; rolling-up the glass-gel sheet such that the glass-gel sheet is in the form of a roll; and placing the roll in a dryer, and drying the flexible gel layer so as to convert it into a flexible aerogel layer and thereby change the glass-gel sheet into a glass-aerogel sheet, such that the glass-aerogel sheet is characterized by a minimum bending radius of less than 200 mm.

2. The method of claim 1 wherein the glass-gel sheet is characterized by a minimum bending radius of less than 100 mm.

3. The method of claim 2 wherein the minimum bending radius of the glass-gel sheet is less than 50 mm.

4. The method of claim 1 wherein the flexible glass sheet has a non-porous face, and said forming the flexible gel layer on the flexible glass sheet comprises forming the flexible gel layer on the non-porous face of the flexible glass sheet.

5. The method of claim 1 wherein the flexible glass sheet has a thickness in a range of from 0.05 mm to 1 mm.

6. The method of claim 5 wherein the thickness of the flexible glass sheet is in a range of from 0.05 mm to 0.5 mm.

7. The method of claim 1 wherein the roll is not on a reel or other support, but rather is a self-supporting roll.

8. The method of claim 1 wherein the roll has a height of at least 36 inches.

9. The method of claim 8 wherein the height of the roll is in a range of from 36 inches to 96 inches.

10. The method of claim 1 wherein the glass-gel sheet is characterized by a flexural modulus of less than 100 MPa.

11. The method of claim 1 wherein the dryer is either a freeze dryer, a supercritical dryer, or an ambient dryer, and said drying comprises either a freeze-drying process, a supercritical drying process, or an ambient drying process.

12. The method of claim 11 wherein the dryer is a supercritical dryer, and said drying comprises a supercritical drying process that includes delivering liquid $CO_2$ into the supercritical dryer.

13. The method of claim 1 wherein the flexible aerogel layer is an outermost layer of the glass-aerogel sheet.

14. The method of claim 1 wherein the glass-aerogel sheet is devoid of an infrared-reflective metal film.

15. The method of claim 1 wherein the glass-aerogel sheet consists of the flexible glass sheet and the flexible aerogel layer.

16. The method of claim 1 further comprising laminating the glass-aerogel sheet to a thicker glass sheet, wherein said laminating involves adhering a first side of an interlayer comprising a polymer to the flexible glass sheet and adhering an opposite, second side of the interlayer to the thicker glass sheet, the thicker glass sheet having a greater thickness than the flexible glass sheet.

17. The method of claim 16 wherein the flexible glass sheet has a thickness in a range of from 0.05 mm to 1 mm, and the thicker glass sheet has a thickness of greater than 2 mm.

18. The method of claim 1 wherein the flexible aerogel layer has a visible transmittance of greater than 90%.

19. The method of claim 1 wherein the flexible aerogel layer has a visible transmittance of greater than 95% and a haze of less than 4%.

20. The method of claim 19 wherein the haze of the flexible aerogel layer is less than 3%.

21. The method of claim 20 wherein the haze of the flexible aerogel layer is less than 2%.

22. The method of claim 1 further comprising unrolling the glass-aerogel sheet before incorporating it into a multiple-pane insulating glass unit that includes first and second glass panes spaced-apart from each other, wherein said incorporating the glass-aerogel sheet into the multiple-pane insulating glass unit results in the glass-aerogel sheet being supported by one of the glass panes of the multiple-pane insulating glass unit.

23. A method of processing glass, the method comprising: forming a flexible gel layer on a flexible glass sheet to create a glass-gel sheet; rolling-up the glass-gel sheet such that the glass-gel sheet is in the form of a roll; placing the roll in a dryer, and drying the flexible gel layer so as to convert it into a flexible aerogel layer and thereby change the glass-gel sheet into a glass-aerogel sheet; and further comprising incorporating the glass-aerogel sheet into a multiple-pane insulating glass unit that includes first and second glass panes spaced-apart from each other, wherein said incorporating the glass-aerogel sheet into the multiple-pane insulating glass unit results in the glass-aerogel sheet being located between the first and second glass panes.

24. The method of claim 23 wherein the flexible aerogel layer has a visible transmittance of greater than 90%.

25. The method of claim 23 wherein the flexible aerogel layer has a visible transmittance of greater than 95% and a haze of less than 4%.

26. The method of claim 25 wherein the haze of the flexible aerogel layer is less than 3%.

27. The method of claim 26 wherein the haze of the flexible aerogel layer is less than 2%.

28. The method of claim 23 wherein the roll is not on a reel or other support, but rather is a self-supporting roll.

29. The method of claim 23 wherein the roll has a height of at least 36 inches.

30. The method of claim 23 wherein the dryer is a supercritical dryer, and said drying comprises a supercritical drying process that includes delivering liquid $CO_2$ into the supercritical dryer.

31. The method of claim 23 wherein the flexible glass sheet is not partially or fully inside the flexible gel layer, but rather is located entirely alongside the flexible gel layer.

32. The method of claim 23 wherein the flexible glass sheet has a non-porous face, and said forming the flexible gel layer on the flexible glass sheet comprises forming the flexible gel layer on the non-porous face of the flexible glass sheet.

33. The method of claim 23 wherein the glass-aerogel sheet is characterized by a minimum bending radius of less than 200 mm, and the flexible aerogel layer has a visible transmittance of greater than 95% and a haze of less than 4%.

34. The method of claim 33 wherein the haze of the flexible aerogel layer is less than 3%.

35. The method of claim 34 wherein the haze of the flexible aerogel layer is less than 2%.

36. The method of claim 23 wherein the glass-aerogel sheet is characterized by a minimum bending radius of the glass-aerogel sheet that is less than 100 mm.

37. The method of claim 23 wherein the multiple-pane insulating glass unit includes a gas gap located alongside the glass-aerogel sheet in a between-pane space between the first and second glass panes of the multiple-pane insulating glass unit.

38. The method of claim 23 comprising unrolling the glass-aerogel sheet before incorporating it into the multiple-pane insulating glass unit such that the glass-aerogel sheet is supported by one of the glass panes of the multiple-pane insulating glass unit.

39. The method of claim 23 wherein the glass-aerogel sheet consists of the flexible glass sheet and the flexible aerogel layer, the flexible aerogel layer having a visible transmittance of greater than 95%.

* * * * *